(12) United States Patent
Gan et al.

(10) Patent No.: US 10,976,109 B2
(45) Date of Patent: Apr. 13, 2021

(54) SYSTEMS AND METHODS FOR COOLING ONE OR MORE BEVERAGE COMPONENTS WITH A PLATE FIN HEAT EXCHANGER

(71) Applicant: The Coca-Cola Company, Atlanta, GA (US)

(72) Inventors: Mingfei Gan, Suwanee, GA (US); Dick P. Welch, Marietta, GA (US); Arthur G. Rudick, Ormond Beach, FL (US)

(73) Assignee: The Coca-Cola Company, Atlanta, GA (US)

( * ) Notice: Subject to any disclaimer, the term of this patent is extended or adjusted under 35 U.S.C. 154(b) by 90 days.

(21) Appl. No.: 16/337,011

(22) PCT Filed: Sep. 28, 2017

(86) PCT No.: PCT/US2017/053875
§ 371 (c)(1),
(2) Date: Mar. 27, 2019

(87) PCT Pub. No.: WO2018/064252
PCT Pub. Date: Apr. 5, 2018

(65) Prior Publication Data
US 2019/0219338 A1 Jul. 18, 2019

Related U.S. Application Data

(60) Provisional application No. 62/400,760, filed on Sep. 28, 2016, provisional application No. 62/451,403, filed on Jan. 27, 2017.

(51) Int. Cl.
*F28D 9/00* (2006.01)
*F28D 20/02* (2006.01)
(Continued)

(52) U.S. Cl.
CPC ............ *F28D 9/0093* (2013.01); *F25D 3/02* (2013.01); *F25D 31/002* (2013.01); *F28D 3/00* (2013.01);
(Continued)

(58) Field of Classification Search
CPC .. F25D 31/002; F25D 2303/0844; F25D 3/02; D28D 9/0056; D28D 2020/0013; D28D 9/0093; D28D 3/00; D28D 20/02
See application file for complete search history.

(56) References Cited

U.S. PATENT DOCUMENTS 4,204,613 A * 5/1980 Terzian ................ B67D 3/0009
165/163
5,099,913 A * 3/1992 Kadle .................. B60H 1/3227
165/147

(Continued)

OTHER PUBLICATIONS

International Search Report and Written Opinion, PCT/US2017/053875, dated Jan. 2, 2018 (12 pp.).

*Primary Examiner* — Elizabeth J Martin
(74) *Attorney, Agent, or Firm* — Eversheds Sutherland (US) LLP

(57) ABSTRACT

A plate heat exchanger is disclosed herein. In some instances, the plate heat exchanger may be disposed in an ice bin of a beverage dispenser for cooling one or more fluids. The plate heat exchanger may include a top plate, a bottom plate, an outer boundary wall, and a fluid flow path disposed between the top plate and the bottom plate. The fluid flow path may include an inlet and an outlet. A fin may be disposed within the fluid flow path from the top plate to the bottom plate between the inlet and the outlet.

10 Claims, 17 Drawing Sheets

(51) Int. Cl.
*F25D 3/02* (2006.01)
*F25D 31/00* (2006.01)
*F28D 3/00* (2006.01)
*F28D 20/00* (2006.01)

(52) U.S. Cl.
CPC ........... *F28D 9/0056* (2013.01); *F28D 20/02* (2013.01); *F25D 2303/0844* (2013.01); *F28D 2020/0013* (2013.01); *Y02E 60/14* (2013.01)

(56) References Cited

U.S. PATENT DOCUMENTS

| | | |
|---|---|---|
| 5,579,650 A | 12/1996 | Cleland et al. |
| 6,681,841 B1 | 1/2004 | Dale |
| 2002/0134088 A1 | 9/2002 | Rudick et al. |
| 2007/0204646 A1 | 9/2007 | Gagliano |
| 2009/0285956 A1* | 11/2009 | Landers ............... F28D 9/0093 426/477 |
| 2011/0154855 A1* | 6/2011 | Sasaki ................. F28D 20/0034 62/524 |
| 2013/0180687 A1 | 7/2013 | Campbell et al. |

* cited by examiner

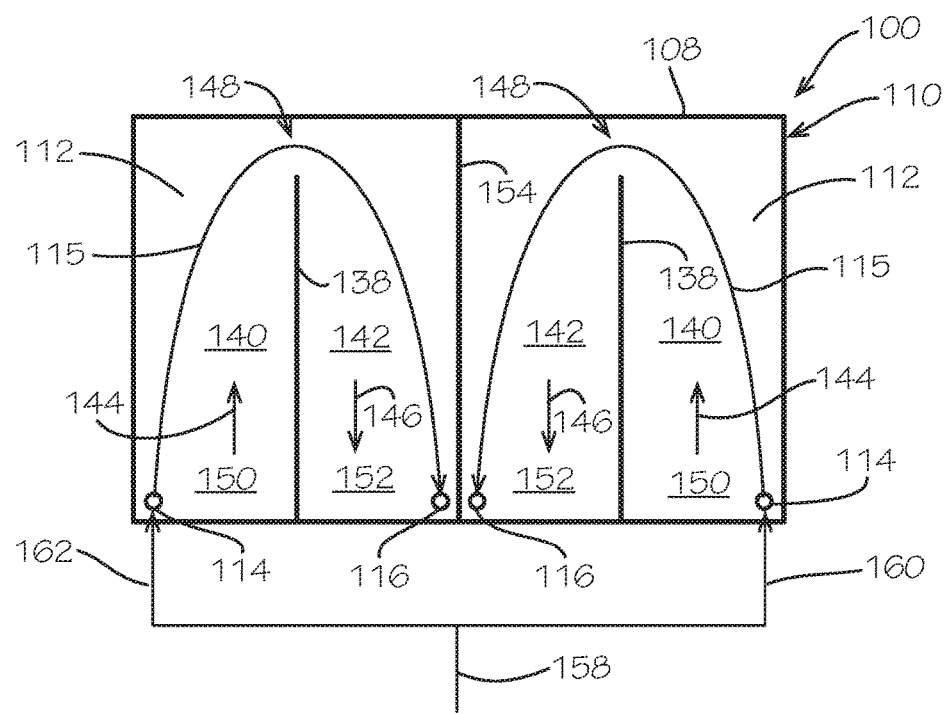
FIG. 10
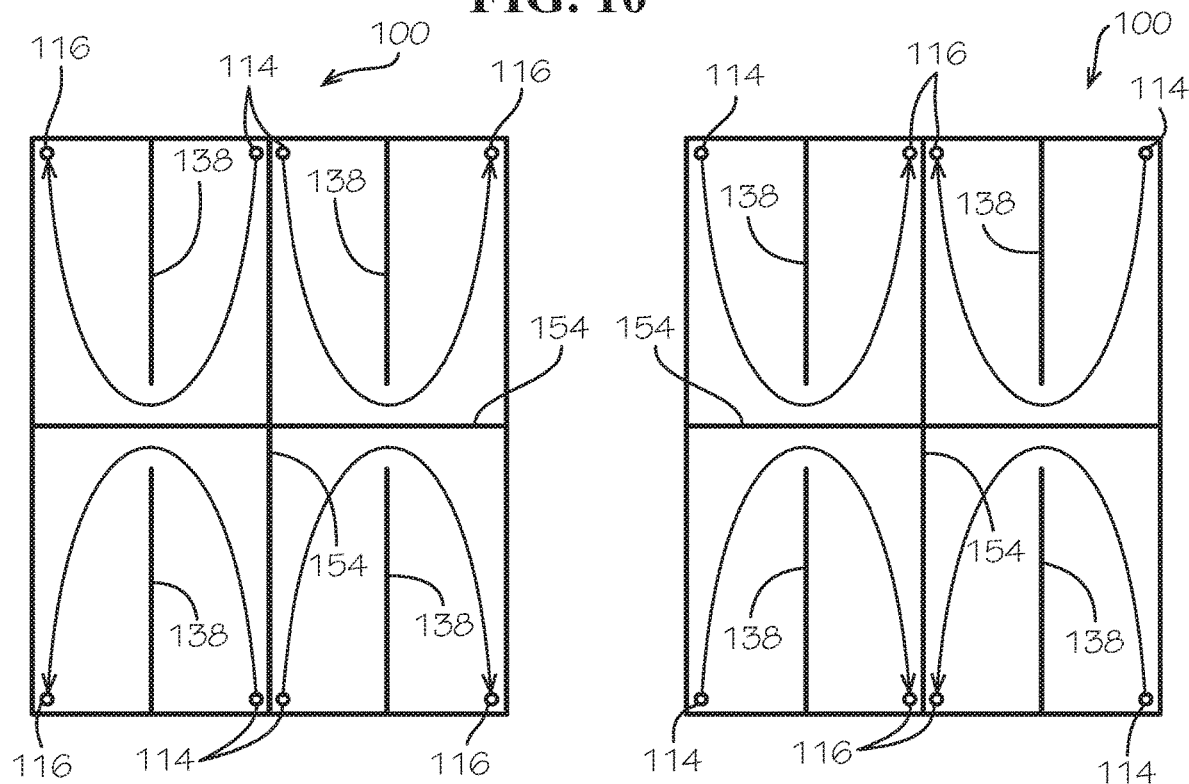
FIG. 11  FIG. 12

SYSTEMS AND METHODS FOR COOLING ONE OR MORE BEVERAGE COMPONENTS WITH A PLATE FIN HEAT EXCHANGER

CROSS-REFERENCE TO RELATED APPLICATIONS

The disclosure claims priority to and the benefit of U.S. provisional application No. 62/400,760, filed Sep. 28, 2016, which is incorporated herein by reference in its entirety. In addition, the disclosure claims priority to and the benefit of U.S. provisional application No. 62/451,403, filed Jan. 27, 2017, which is incorporated herein by reference in its entirety.

FIELD

The disclosure generally relates to beverages and more particularly relates to systems and methods for cooling one or more beverage components with a plate fin heat exchanger.

BACKGROUND

Various types of beverage dispensers are commonly used to dispense cold beverages, such as carbonated beverages, water, and other beverages. Certain beverage dispensers may include a cold plate for cooling a beverage or beverage ingredients, such as carbonated water, plain water, and syrup, within the dispenser prior to dispensing the desired beverage therefrom. Generally described, the cold plate may be formed as an aluminum casting having a number of tubes or sleeves positioned therein and configured to allow the beverage ingredients to flow therethrough. The cold plate generally may be positioned within the beverage dispenser and in direct physical contact with an ice bin of the dispenser. For example, the cold plate may form or be disposed about the bottom of the ice bin. As the beverage ingredients pass through the tubes or sleeves of the cold plate, heat may be exchanged between the ingredients, the cold plate, and the ice contained within the ice bin. In this manner, the beverage ingredients may be appropriately cooled within the cold plate, prior to dispensing via a nozzle, such that the beverage dispenser provides the consumer with a cold beverage.

Although existing cold plates may be suitable for cooling many types of beverage ingredients, the extent of cooling provided may vary depending on the heat transfer efficiency of the cold plate. There is thus a desire for to increase the heat transfer efficiency of the cold plate. In addition, increased flexibility in the configuration of the cold plate is desired to accommodate a variety of ingredients. More so, it is desirable to reduce the cost of the cold plate by reducing the materials to be used.

SUMMARY

A plate heat exchanger disclosed herein. The plate heat exchanger may be disposed in thermal contact with a cooling media (such as ice) within or near a beverage dispenser for cooling one or more fluids. The cold plate may also be in thermal contract with a cooling media, which may extract heat from the ingredients through the cold plate. For example, the refrigerant may pass through spate flow paths within the cold plate. The cold plate heat exchanger may include a top plate, a bottom plate, an outer boundary wall, and a fluid flow path disposed between the top plate and the bottom plate. The fluid flow path may include an inlet and an outlet. A fin may be disposed within the fluid flow path from the top plate to the bottom plate between the inlet and the outlet.

Other features and aspects of the disclosure will be apparent or will become apparent to one with skill in the art upon examination of the following figures and the detailed description. All other features and aspects, as well as other system, method, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 10 depicts a plate fin heat exchanger with the top plate and fin omitted in accordance with one or more embodiments of the disclosure.

FIG. 11 depicts a plate fin heat exchanger with the top plate and fin omitted in accordance with one or more embodiments of the disclosure.

FIG. 12 depicts a plate fin heat exchanger with the top plate and fin omitted in accordance with one or more embodiments of the disclosure.

DETAILED DESCRIPTION

Figure 1:
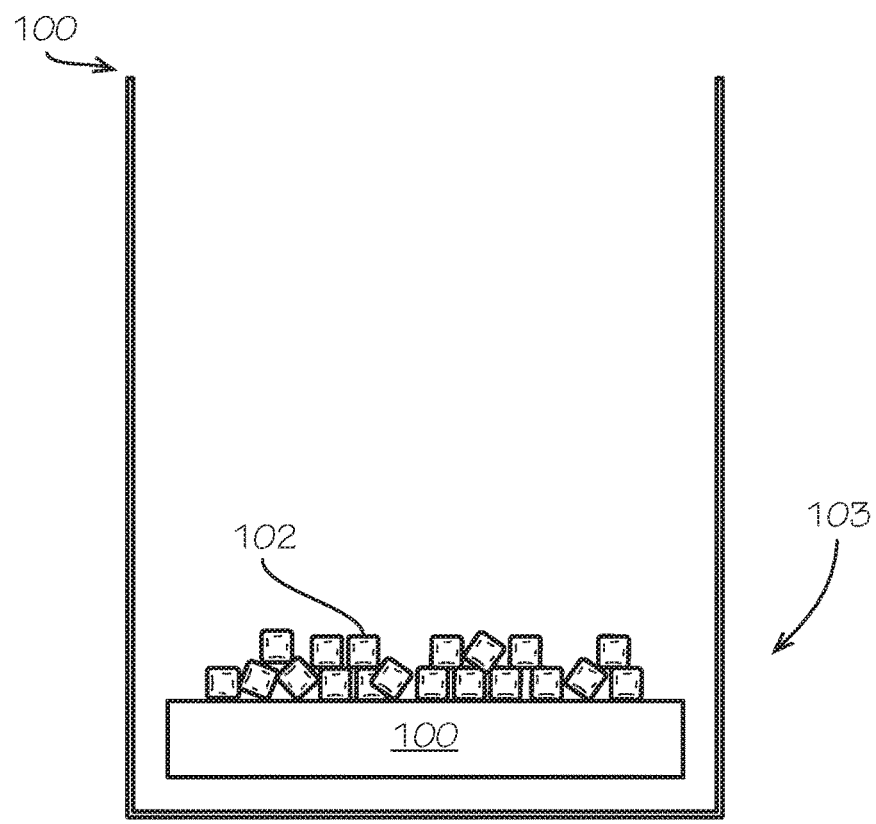
FIG. 1 depicts a plate fin heat exchanger disposed in an ice bin in accordance with one or more embodiments of the disclosure.

Described below are embodiments of a plate fin heat exchanger (as well as individual components of the plate fin heat exchanger). In some instances, the plate fin heat exchanger may be a cold plate. In one example, the plate fin heat exchanger may be disposed within an ice bin of a beverage dispenser for cooling one or more fluids, such as water, carbonated water, macro-ingredients, and/or micro-ingredients. The plate fin heat exchanger may be in thermal contact with any cooling media within or near a beverage dispenser. Any beverage component may be cooled using the plate fin heat exchanger. Due to the inclusion of a fin and the routing of the fluid flows therein, the plate fin heat exchanger may provide increased heat transfer between the ice in the ice bin and the fluid flowing within the plate fin heat exchanger.

Generally described, the macro-ingredients may have reconstitution ratios in the range from full strength (no dilution) to about six (6) to one (1) (but generally less than about ten (10) to one (1)). As used herein, the reconstitution ratio refers to the ratio of diluent (e.g., water or carbonated water) to beverage ingredient. Therefore, a macro-ingredient with a 5:1 reconstitution ratio refers to a macro-ingredient that is to be mixed with five parts diluent for every part of the macro-ingredient in the finished beverage. Many macro-ingredients may have reconstitution ratios in the range of about 3:1 to 5.5:1, including 4.5:1, 4.75:1, 5:1, 5.25:1, and 5.5:1 reconstitution ratios. The macro-ingredients may include sweeteners such as sugar syrup, HFCS ("High Fructose Corn Syrup"), FIS ("Fully Inverted Sugar"), MIS ("Medium Inverted Sugar"), mid-calorie sweeteners comprised of nutritive and non-nutritive or high intencity sweetener blends, and other such nutritive sweeteners that are difficult to pump and accurately meter at concentrations greater than about 10:1—particularly after having been cooled to standard beverage dispensing temperatures of around 35-45° F. An erythritol sweetener may also be considered a macro-ingredient sweetener when used as the primary sweetener source for a beverage, though typically erythritol will be blended with other sweetener sources and used in solutions with higher reconstitution ratios such that it may be considered a micro-ingredient as described below. The macro-ingredients may also include concentrated extracts, purees, and similar types of ingredients. Other ingredients may include traditional BIB ("bag-in-box") flavored syrups (e.g., COCA-COLA bag-in-box syrup), juice concentrates, dairy products, soy, and rice concentrates. Similarly, a macro-ingredient base product may include the sweetener as well as flavorings, acids, and other common components of a beverage syrup. The beverage syrup with sugar, HFCS, or other macro-ingredient base products generally may be stored in a conventional bag-in-box container remote from the dispenser. The viscosity of the macro-ingredients may range from about 1 to about 10,000 centipoise and generally over 100 centipoises or so when chilled. Other types of macro-ingredients may be used herein.

The micro-ingredients may have reconstitution ratios ranging from about ten (10) to one (1) and higher. Specifically, many micro-ingredients may have reconstitution ratios in the range of about 20:1, to 50:1, to 100:1, to 300:1, or higher. The viscosities of the micro-ingredients typically range from about one (1) to about six (6) centipoise or so, but may vary from this range. Examples of micro-ingredients include natural or artificial flavors; flavor additives; natural or artificial colors; artificial sweeteners (high potency, nonnutritive, or otherwise); antifoam agents, non-nutritive ingredients, additives for controlling tartness, e.g., citric acid or potassium citrate; functional additives such as vitamins, minerals, herbal extracts, nutricuticals; and over the counter (or otherwise) medicines such as pseudoephedrine, acetaminophen; and similar types of ingredients. Various acids may be used in micro-ingredients including food acid concentrates such as phosphoric acid, citric acid, malic acid, or any other such common food acids. Various types of alcohols may be used as either macro- or micro-ingredients. The micro-ingredients may be in liquid, gaseous, or powder form (and/or combinations thereof including soluble and suspended ingredients in a variety of media, including water, organic solvents, and oils). Other types of micro-ingredients may be used herein.

Typically, micro-ingredients for a finished beverage product include separately stored non-sweetener beverage component concentrates that constitute the flavor components of the finished beverage. Non-sweetener beverage component concentrates do not act as a primary sweetener source for the finished beverage and do not contain added sweeteners, though some non-sweetener beverage component concentrates may have sweet tasting flavor components or flavor components that are perceived as sweet in them. These non-sweetener beverage component concentrates may include the food acid concentrate and food acid-degradable (or non-acid) concentrate components of the flavor, such as described in commonly owned U.S. patent application Ser. No. 11/276,553 entitled "Methods and Apparatus for Making Compositions Comprising and Acid and Acid Degradable Component and/or Compositions Comprising a Plurality of Selectable Components," which is herein incorporated by reference in its entirety. As noted above, micro-ingredients may have reconstitution ratios ranging from about ten (10) to one (1) and higher, where the micro-ingredients for the separately stored non-sweetener beverage component concentrates that constitute the flavor components of the finished beverage typically have reconstitution ratios ranging from 50:1, 75:1, 100:1, 150:1, 300:1, or higher.

For example, the non-sweetener flavor components of a cola finished beverage may be provided from separately stored first non-sweetener beverage component concentrate and a second non-sweetener beverage component concentrate. The first non-sweetener beverage component concentrate may comprise the food acid concentrate components of the cola finished beverage, such as phosphoric acid. The second non-sweetener beverage component concentrate may comprise the food acid-degradable concentrate components of the cola finished beverage, such as flavor oils that would react with and impact the taste and shelf life of a non-sweetener beverage component concentrate were they to be stored with the phosphoric acid or other food acid concentrate components separately stored in the first non-sweetener component concentrate. While the second non-sweetener beverage component concentrate does not include the food acid concentrate components of the first non-sweetener beverage component concentrate (e.g., phosphoric acid), the second non-sweetener beverage component concentrate may still be a high-acid beverage component solution (e.g., pH less than 4.6).

A finished beverage may have a plurality of non-sweetener concentrate components of the flavor other than the acid concentrate component of the finished beverage. For example, the non-sweetener flavor components of a cherry cola finished beverage may be provided from the separately stored non-sweetener beverage component concentrates described in the above example as well as a cherry non-sweetener component concentrate. The cherry non-sweetener component concentrate may be dispensed in an amount consistent with a recipe for the cherry cola finished beverage. Such a recipe may have more, less, or the same amount of the cherry non-sweetener component concentrate than other recipes for other finished beverages that include the cherry non-sweetener component concentrate. For example, the amount of cherry specified in the recipe for a cherry cola finished beverage may be more than the amount of cherry specified in the recipe for a cherry lemon-lime finished beverage to provide an optimal taste profile for each of the finished beverage versions. Such recipe-based flavor versions of finished beverages are to be contrasted with the addition of flavor additives or flavor shots as described below.

Other typical micro-ingredients for a finished beverage product may include micro-ingredient sweeteners. Micro-ingredient sweeteners may include high intensity sweeteners such as aspartame, Ace-K, steviol glycosides (e.g., Reb A, Reb M), sucralose, saccharin, or combinations thereof. Micro-ingredient sweeteners may also include erythritol when dispensed in combination with one or more other sweetener sources or when using blends of erythritol and one or more high intensity sweeteners as a single sweetener source.

Other typical micro-ingredients for supplementing a finished beverage product may include micro-ingredient flavor additives. Micro-ingredient flavor additives may include additional flavor options that can be added to a base beverage flavor. The micro-ingredient flavor additives may be non-sweetener beverage component concentrates. For example, a base beverage may be a cola flavored beverage, whereas cherry, lime, lemon, orange, and the like may be added to the cola beverage as flavor additives, sometimes referred to as flavor shots. In contrast to recipe-based flavor versions of finished beverages, the amount of micro-ingredient flavor additive added to supplement a finished beverage may be consistent among different finished beverages. For example, the amount of cherry non-sweetener component concentrate included as a flavor additive or flavor shot in a cola finished beverage may be the same as the amount of cherry non-sweetener component concentrate included as a flavor additive or flavor shot in a lemon-lime finished beverage. Additionally, whereas a recipe-based flavor version of a finished beverage is selectable via a single finished beverage selection icon or button (e.g., cherry cola icon/button), a flavor additive or flavor shot is a supplemental selection in addition to the finished beverage selection icon or button (e.g., cola icon/button selection followed by a cherry icon/button selection).

As is generally understood, such beverage selections may be made through a touchscreen user interface or other typical beverage user interface selection mechanism (e.g., buttons) on the beverage dispenser. The selected beverage, including any selected flavor additives, may then be dispensed upon the beverage dispenser receiving a further dispense command through a separate dispense button on the touchscreen user interface or through interaction with a separate pour mechanism such as a pour button (electromechanical, capacitive touch, or otherwise) or pour lever.

In the traditional BIB flavored syrup delivery of a finished beverage, a macro-ingredient flavored syrup that contains all of a finished beverage's sweetener, flavors, and acids is mixed with a diluent source such as plain or carbonated water in ratios of around 3:1 to 6:1 of diluent to the syrup. In contrast, for a micro-ingredient delivery of a finished beverage, the sweetener(s) and the non-sweetener beverage component concentrates of the finished beverage are all separately stored and mixed together about a nozzle when the finished beverage is dispensed. Example nozzles suitable for dispensing of such micro-ingredients include those described in commonly owned U.S. provisional patent application Ser. No. 62/433,886, entitled "Dispensing Nozzle Assembly," PCT patent application Ser. No. PCT/US15/026657, entitled "Common Dispensing Nozzle Assembly," U.S. Pat. No. 7,866,509, entitled "Dispensing Nozzle Assembly," or U.S. Pat. No. 7,578,415, entitled "Dispensing Nozzle Assembly," which are all herein incorporated by reference in their entirety.

In operation, the beverage dispenser may dispense finished beverages from any one or more of the macro-ingredient or micro-ingredient sources described above. For example, similar to the traditional BIB flavored syrup delivery of a finished beverage, a macro-ingredient flavored syrup may be dispensed with a diluent source such as plain or carbonated water to produce a finished beverage. Additionally, the traditional BIB flavored syrup may be dispensed with the diluent and one or more micro-ingredient flavor additives to increase the variety of beverages offered by the beverage dispenser.

Micro-ingredient-based finished beverages may be dispensed by separately dispensing each of the two or more non-sweetener beverage component concentrates of the finished beverage along with a sweetener and diluent. The sweetener may be a macro-ingredient sweetener or a micro-ingredient sweetener and the diluent may be water or carbonated water. For example, a micro-ingredient-based cola finished beverage may be dispensed by separately dispensing a food acid concentrate components of the cola finished beverage, such as phosphoric acid, food acid-degradable concentrate components of the cola finished beverage, such as flavor oils, macro-ingredient sweetener, such as HFCS, and carbonated water. In another example, a micro-ingredient-based diet-cola finished beverage may be dispensed by separately dispensing a food acid concentrate components of the diet-cola finished beverage, food acid-degradable concentrate components of the diet-cola finished beverage, micro-ingredient sweetener, such as aspartame or an aspartame blend, and carbonated water. As a further example, a mid-calorie micro-ingredient-based cola finished beverage may be dispensed by separately dispensing a food acid concentrate components of the mid-calorie cola finished beverage, food acid-degradable concentrate components of the mid-calorie cola finished beverage, a reduced amount of a macro-ingredient sweetener, a reduced amount of a micro-ingredient sweetener, and carbonated water. By reduced amount of macro-ingredient and micro-ingredient sweeteners, it is meant to be in comparison with the amount of macro-ingredient or micro-ingredient sweetener used in the cola finished beverage and diet-cola finished beverage. As a final example, a supplementally flavored micro-ingredient-based beverage, such as a cherry cola beverage or a cola beverage with an orange flavor shot, may be dispensed by separately dispensing a food acid concentrate components of the flavored cola finished beverage, food acid-degradable concentrate components of the flavored cola finished beverage, one or more non-sweetener micro-ingredient flavor additives (dispensed as either as a recipe-based flavor version of a finished beverage or a flavor shot), a sweetener (macro-ingredient sweetener, micro-ingredient sweetener, or combinations thereof), and carbonated water. While the above examples are provided for carbonated beverages, they apply to still beverages as well by substituting carbonated water with plain water.

The various ingredients may be dispensed by the beverage dispenser in a continuous pour mode where the appropriate ingredients in the appropriate proportions (e.g., in a predetermined ratio) for a given flow rate of the beverage being dispensed. In other words, as opposed to a conventional batch operation where a predetermined amount of ingredients are combined, the beverage dispenser provides for continuous mixing and flows in the correct ratio of ingredients for a pour of any volume. This continuous mix and flow method can also be applied to the dispensing of a particular size beverage selected by the selection of a beverage size button by setting a predetermined dispensing time for each size of beverage.

FIG. 1 depicts a plate fin heat exchanger 100. The plate fin heat exchanger 100 may be disposed within an ice bin 101 of a beverage dispenser. In some instances, the plate fin heat exchanger 100 may be disposed at the bottom 103 of the ice bin 101. In this manner, ice 102 may be disposed on top of the plate fin heat exchanger 100. The ice 102 may extract heat from the plate fin heat exchanger 100 to cool one or more fluids flowing therein.

Figure 2:
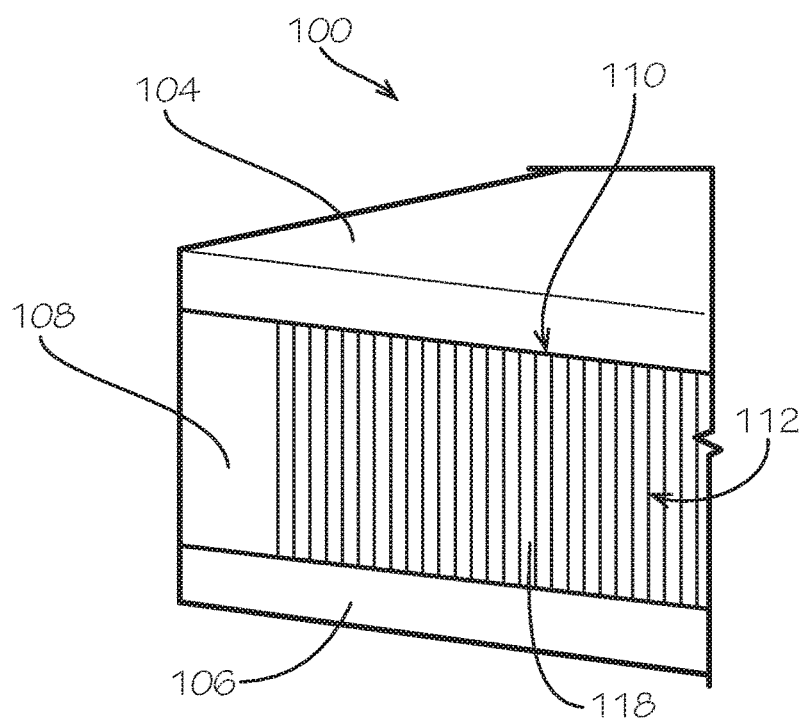
FIG. 2 depicts a plate fin heat exchanger in accordance with one or more embodiments of the disclosure.
Figure 3:
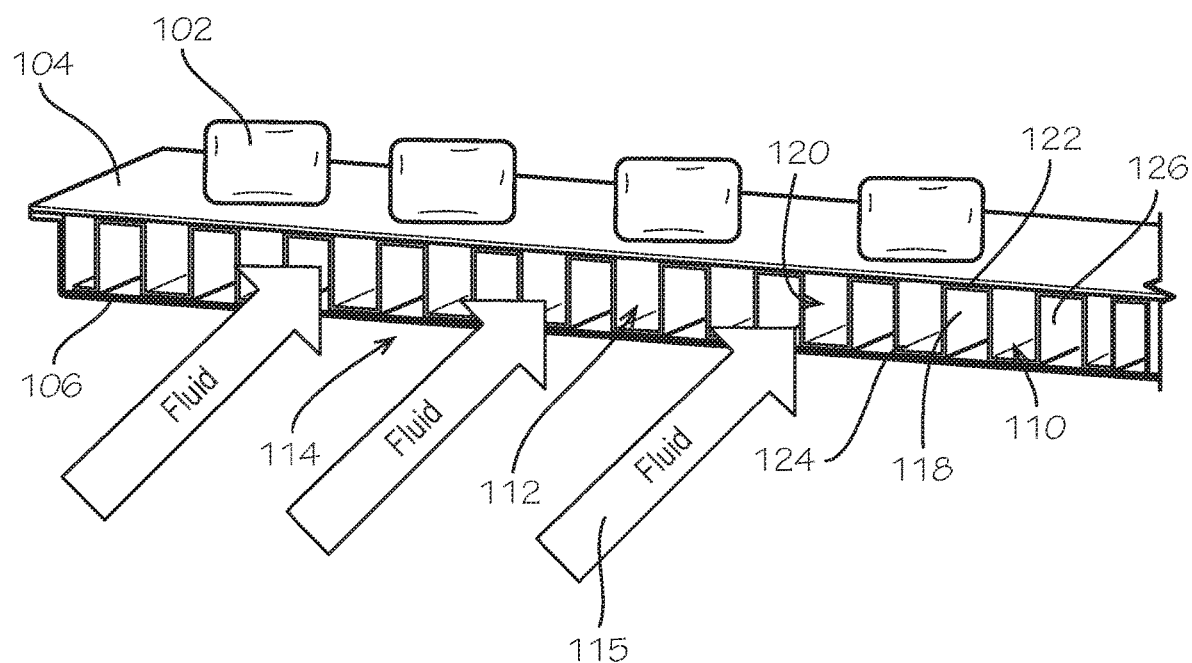
FIG. 3 depicts a plate fin heat exchanger in accordance with one or more embodiments of the disclosure.

As depicted in FIGS. 2 and 3, the plate fin heat exchanger 100 may include a top plate 104, a bottom plate 106, and an outer boundary wall 108. The top plate 104 may be spaced apart from the bottom plate 106. In some instances, the outer boundary wall 108 may be at least partially formed by a bar or the like. The outer boundary wall 108 is relative. That is, in some instances, the outer boundary wall 108 may extend about a perimeter of the plate fin heat exchanger 100 to form collectively an enclosure 110 between the top plate 104, the bottom plate 106, and the outer boundary wall 108. In other instances, the outer boundary wall 108 may be disposed within the enclosure 110 and surround a fluid flow path 112. In some instances, the enclosure 110 may be hermetically sealed.

Figure 4:
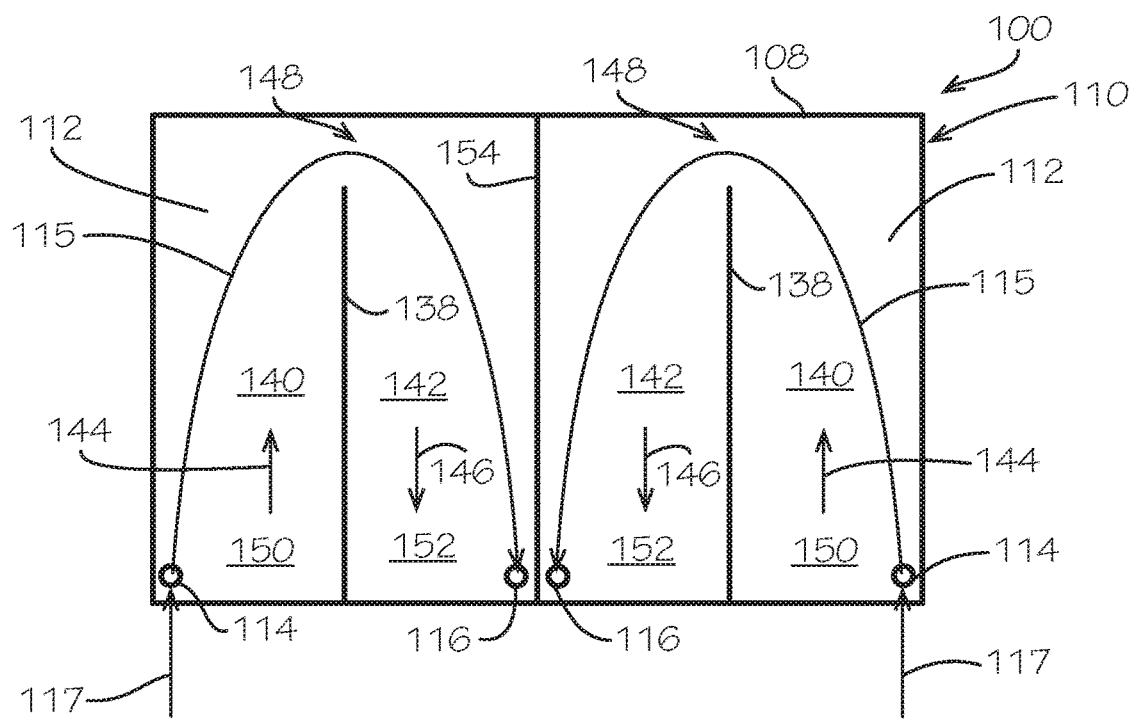
FIG. 4 depicts a plate fin heat exchanger with the top plate and fin omitted in accordance with one or more embodiments of the disclosure.

A fluid flow path 112 may be formed between the top plate 104 and the bottom plate 106. FIG. 4 schematically depicts a top view of the plate fin heat exchanger 100 with the top plate 104 and fin 118 (discussed below) omitted. As depicted in FIG. 4, the fluid flow path 112 may include an inlet 114 and an outlet 116. In some instances, the fin 118 may be at least partially disposed between the inlet 114 and the outlet 116. The inlet 114 may be in communication with a fluid 115 (such as water, carbonated water, macro-ingredients, and/or micro-ingredients) by way of a fluid conduit 117. The inlet 114 and the outlet 116 may be disposed on the same side of the plate fin heat exchanger 100 or on opposite sides of plate fin heat exchanger 100. In this manner, the fluid 115 may flow along the fluid flow path 112 from the inlet 114 to the outlet 116. As the fluid flows from the inlet 114 to the outlet 116, it may be cooled via heat transfer with the ice 102 from the ice bin 101. As discussed in greater detail below, in some instances, the plate fin heat exchanger 100 may include a number of fluid flow paths 112 within the enclosure 110. The same or different fluids may flow within the fluid flow paths 112.

Referring back to FIGS. 2 and 3, in order to increase heat transfer with the fluid flow path 112, a fin 118 may be disposed within the fluid flow path 112 between the top plate 104 and the bottom plate 106. In one example embodiment, the fin 118 may be in surface contact the top plate 104 and the bottom plate 106. In some instances, the fin 118 may be disposed along the entire fluid flow path 112 between the inlet 114 and the outlet 116. In other instances, the fin 118 may be disposed along a portion of fluid flow path 112 between the inlet 114 and the outlet 116. The fin space and thickness may be adjusted for different cooling requirements.

Figure 5:
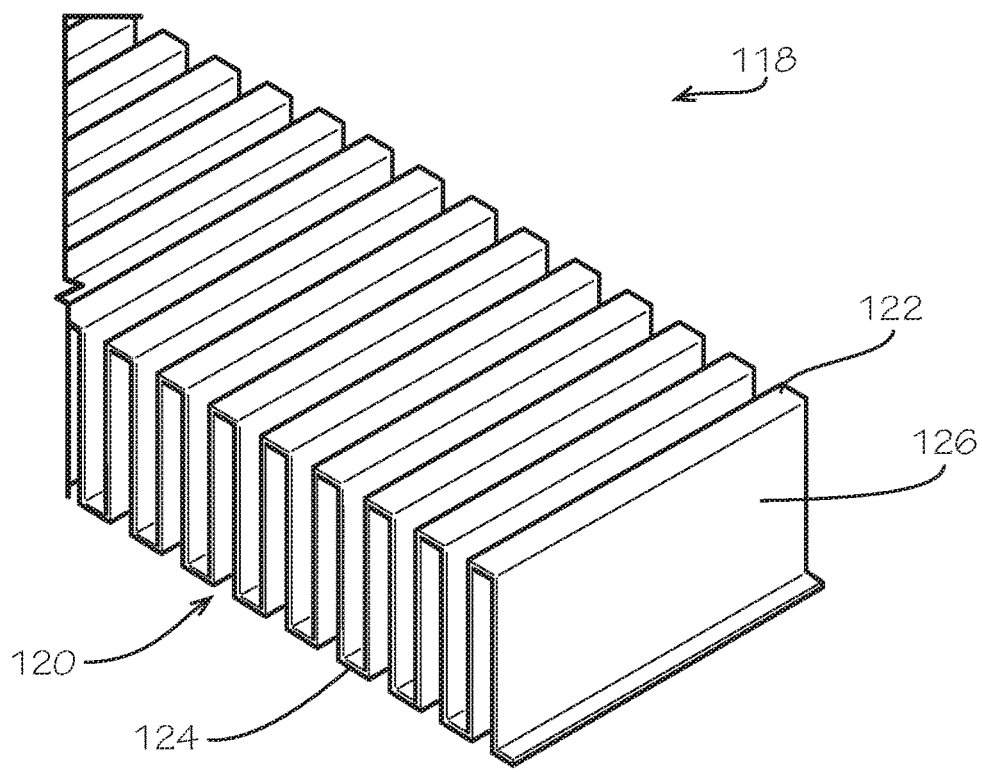
FIG. 5 depicts a fin in accordance with one or more embodiments of the disclosure.

In one example embodiment, as depicted in FIGS. 3 and 5, the fin 118 may be a single unitary structure with a number of folds that form a number of channels 120. In some instance, the channels 120 may be U-shaped. For example, the fin 118 may be a corrugated panel. In this manner, a fluid 115 may flow within the fluid flow path 112 through the channels 120 from the inlet 114 to the outlet 116. In some instances, due to the shape of the channels 120, the fin 118 may include upper walls 122 that contact the top panel 104, lower walls 124 that contact the bottom panel 106, and inner walls 126 that extend from the upper walls 122 to the lower walls 124. The channels 120 may provide increased surface area for greater heat transfer with the fluid flow therein. The fin 118 also may provide increased thermal conductivity between the top plate 104 and the bottom plate 106.

Figure 6:
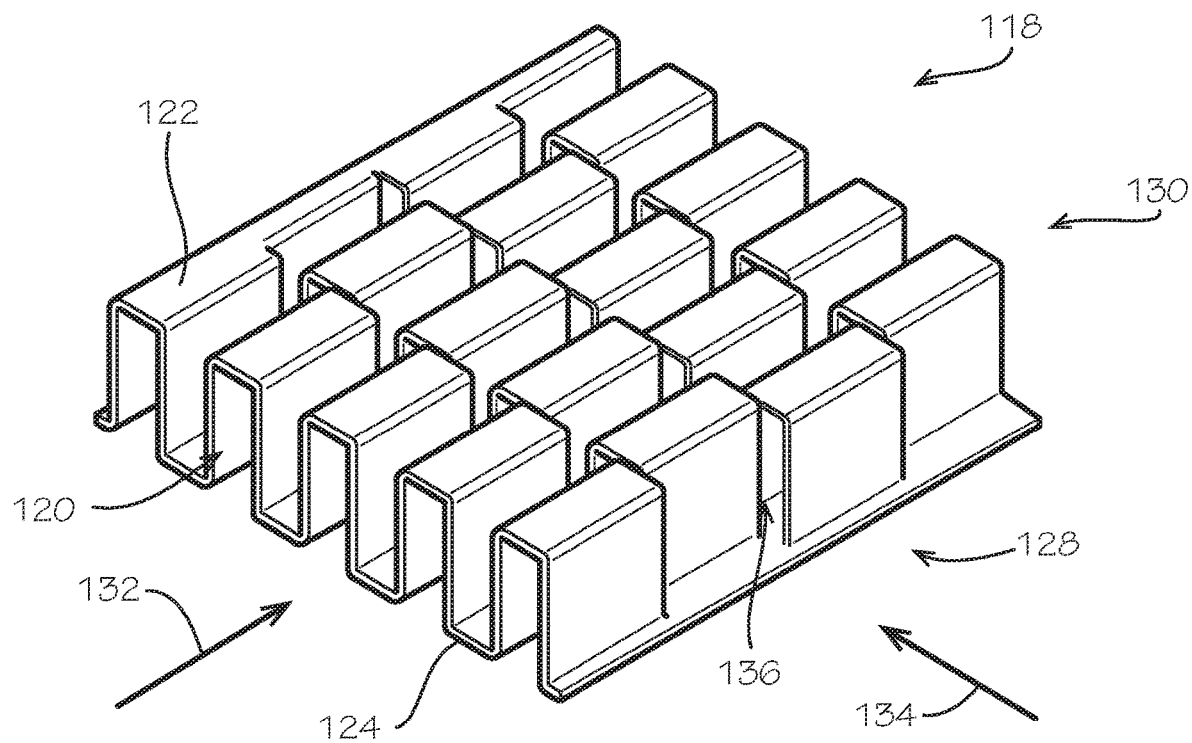
FIG. 6 depicts a fin in accordance with one or more embodiments of the disclosure.

In another embodiment, as depicted in FIG. 6, the fin 118 may include a single unitary structure having a number of rows 128 and a number of columns 130. In some instances, the rows 128 may be at least partially offset from adjacent rows 128. That is, the rows 128 may be staggered. The offset of the rows 128 may be uniform or non-uniform. The offset of the rows 128 may increase a turbulent flow within the fluid flow path 112, thereby increasing heat transfer. The fluid 115 may flow in the direction indicated by arrow 132 or in the direction indicated by arrow 134. Due to the offset rows 128, openings 136 may be formed between the rows 128 and columns 130, which may allow fluid flow in any direction. The tortured path created by the offset rows 128 may cause turbulence within the fluid flow, thereby increasing heat transfer. In addition, different types and shapes of fins may be used to increase the heat transfer, such as louvered, lanced, wavy, etc.

Referring back to FIG. 4, in some instances, a rib 138 (or a divider bar) may be disposed within the fluid flow path 112 between the top plate 104 and the bottom plate 106. The rib 138 may divide the fluid flow path 112 into a first portion 140 and a second portion 142. In such instances, the inlet 114 may be disposed in the first portion 140 and the outlet 116 may be disposed in the second portion 142. The fin 118 may be disposed in the first portion 140, the second portion, 142, or a combination thereof. In some instances, a first fin may be at least partially disposed in the first portion, and a second fin may be at least partially disposed in the second portion 142. The rib 138 may partition the fluid flow path 112 to be substantially U-shaped. In such instances, a first flow direction 144 in the first portion 140 of the fluid flow path 112 may be counter to a second flow direction 146 in the second portion 142 of the fluid flow path 114. The rib 138 may not extend the entire length of the plate fin heat exchanger 100. Instead, the rib 138 may extend partially from one end of the plate fin heat exchanger 100 to the other. The rib 138 may not extend into the opening 148. The inlet 114 and the outlet 116 may be disposed on opposite side of the rib 138. In this manner, the fluid may flow from the inlet 114 in the first flow direction 144 within the first portion 140 to the opening 148, where the fluid may be redirected in the opposite direction 146 to the outlet 116.

Any number of ribs 138 may be used. In other instances, the rib 138 may be omitted. When more than one rib 138 is used, the fluid flow paths 112 may be partitioned into more than two portions. The bar frame assembly and the header may be used to create different flow paths.

Figure 7:
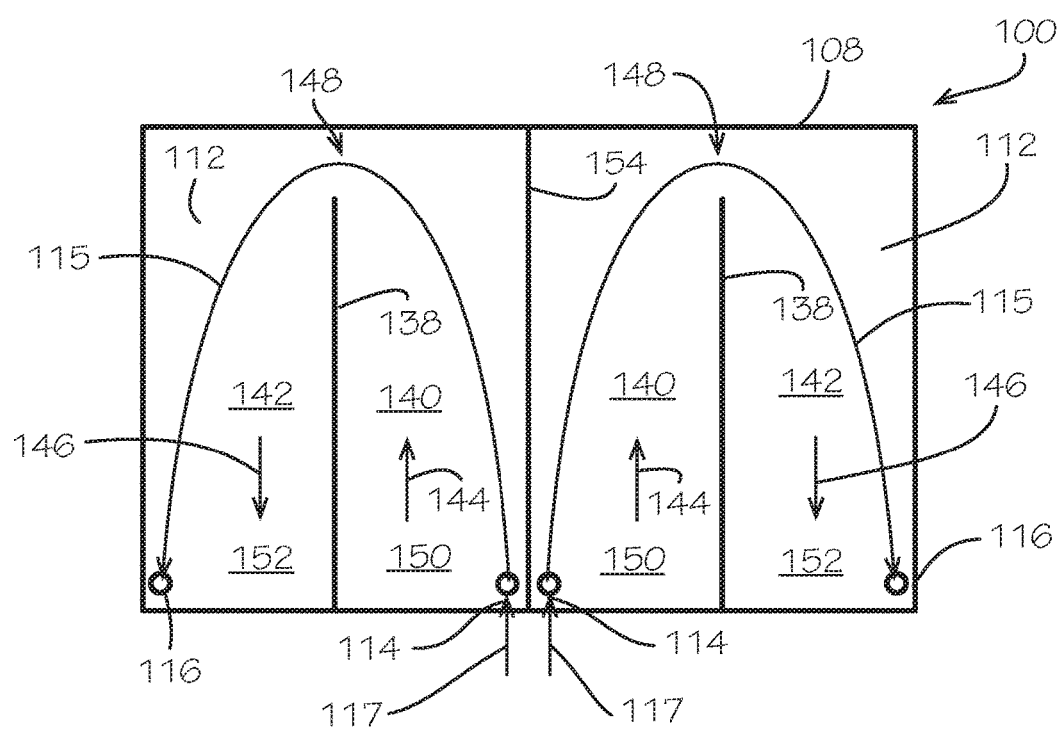
FIG. 7 depicts a plate fin heat exchanger with the top plate and fin omitted in accordance with one or more embodiments of the disclosure.
Figure 8:
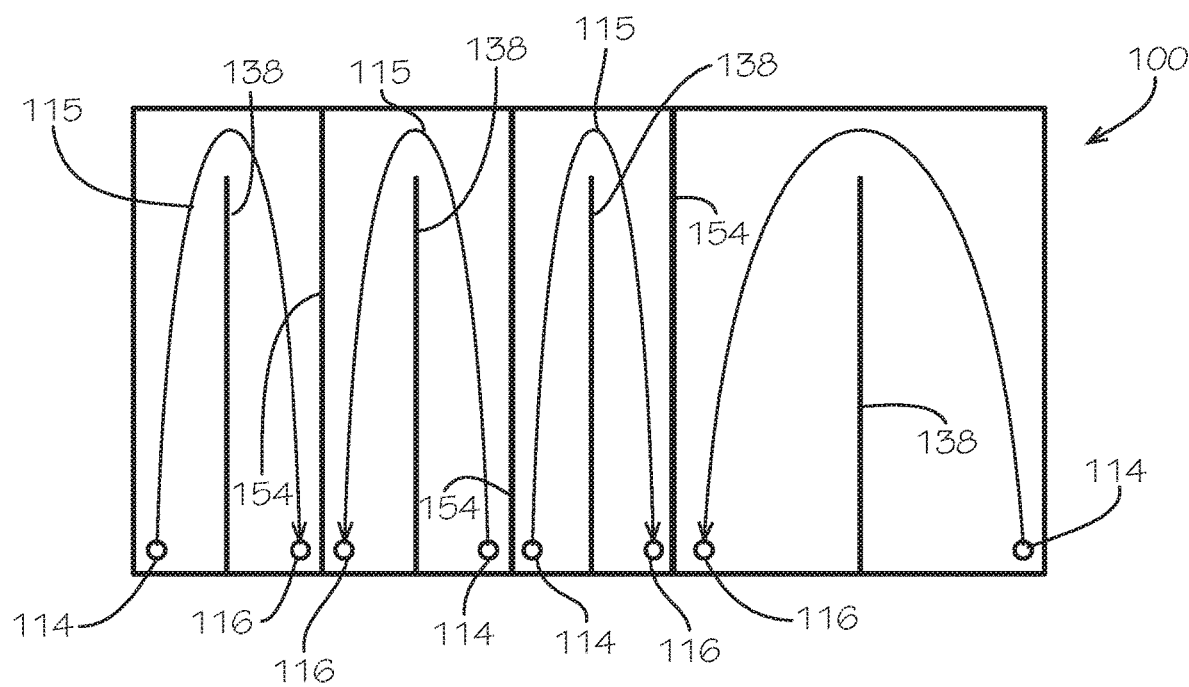
FIG. 8 depicts a plate fin heat exchanger with the top plate and fin omitted in accordance with one or more embodiments of the disclosure.

As depicted in FIGS. 4, 7, 8, and 10-12, the plate fin heat exchanger 100 may include a number fluid flow paths 112 disposed between the top plate 104 and the bottom plate 106. Each of the fluid flow paths 112 may include an inlet flow portion 150 and an outlet flow portion 152. The inlet flow portion 150 and the outlet flow portion 152 may correspond respectively to the first portion 140 and the second portion 142 partitioned by the rib 138. In some instances, the inlet flow portions 150 may include fluid flows that are relatively warmer than the outlet flow portions 152. That is, the fluid 115 within the plate fin heat exchanger 100 is typically warmer at the inlet 114 than when it exits 116. The fluid 115 typically gets gradually cooler as it flows along the fluid flow path 112 from the inlet 114 to the outlet 116. As a result, it may not be desirably to position the inlet flow portions 150 adjacent to the outlet flow portions 152 of adjacent fluid flow paths 112. Such positioning of the fluid flows may results in diminished heat transfer. Therefore, as depicted in FIGS. 7, 8, and 11, the inlet flow portion 150 of a respective fluid flow path 112 may be disposed adjacent to another inlet flow portion 150 of a respective fluid flow path 112 that is adjacent thereto. The adjacent inlet flow portions 150 may be separated by and share an internal wall 154. Similarly, as depicted in FIGS. 4, 8, and 12, the outlet flow portion 152 of a respective fluid flow path 112 may be disposed adjacent to another outlet flow portion 152 of a respective fluid flow path 112 that is adjacent thereto. The adjacent outlet flow portions 152 may be separated by and share an internal wall 154. In this manner, any heat exchanged through the internal wall 154 between adjacent inlet flow portions 150 or the adjacent outlet flow portions 152 may be minimal or have a minimal effect on the overall heat transfer of the plate fin heat exchanger 100.

Figure 9:
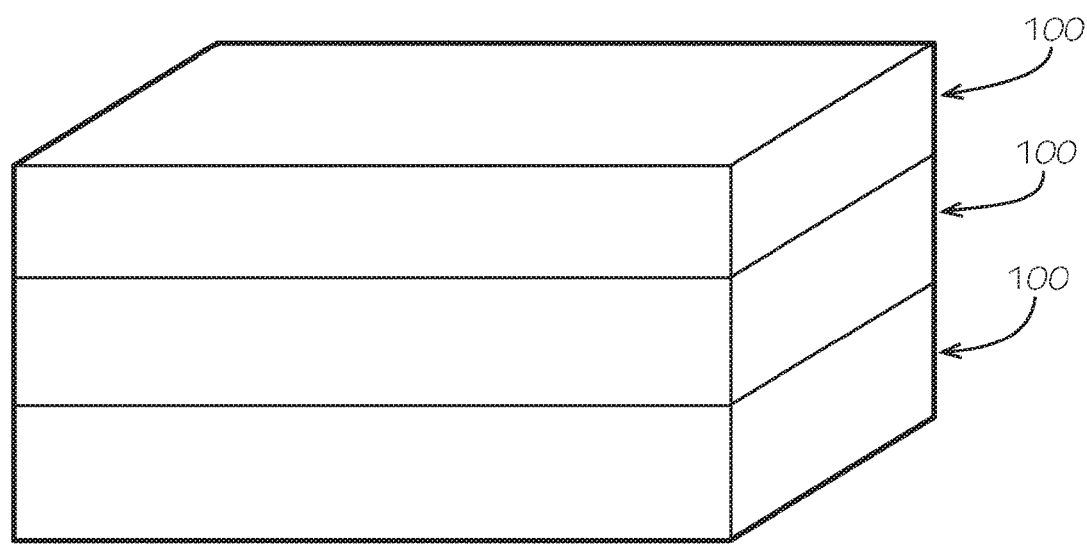
FIG. 9 depicts a stack of plate fin heat exchangers in accordance with one or more embodiments of the disclosure.

FIG. 9 depicts a number of the cold plate heat exchangers 100 stacked together. In such a configuration, the inlet flow portion 150 of a respective fluid flow path 112 may be disposed adjacent to (above and/or below) another inlet flow portion 150 of a respective fluid flow path 112 that is stacked adjacent thereto. Likewise, the outlet flow portion 152 of a respective fluid flow path 112 may be disposed adjacent to (above and/or below) another outlet flow portion 152 of a respective fluid flow path 112 that is stacked adjacent thereto.

FIG. 10 depicts certain fluids 115 using multiple fluid flow paths 112. For example, a water conduit 158 may split into a first inlet conduit 160 and a second inlet conduit 162. Each of the inlet conduits 160 and 162 is associated with a respective inlet 114 of a fluid flow path 112. In this particular embodiment, the respective inlets 114 may be spaced apart on opposite sides of the cold plate heat exchangers 100 such that the outlet flow portion 152 of the respective fluid flow path 112 are disposed adjacent each other. In this manner, any heat exchanged through the internal wall 154 between the adjacent outlet flow portions 152 may be minimal or have a minimal effect on the overall heat transfer of the plate fin heat exchanger 100. In other embodiments, the respective inlets 114 may be disposed adjacent to each other such that the inlet flow portion 150 of the respective fluid flow path 112 are disposed adjacent each other. In this manner, any heat exchanged through the internal wall 154 between the adjacent inlet flow portions 150 may be minimal or have a minimal effect on the overall heat transfer of the plate fin heat exchanger 100.

FIGS. 13-21 are directed to additional embodiments of heat exchangers for cooling one or more fluids in a beverage dispenser. A vapor chamber styled heat exchanger for use in the beverage industry involves a number of tubes containing liquid to be chilled, a heat-sink surface (which may be a water bath or ice plate, another set of tubing, or any combination thereof), and a heat transporting mechanism (preferably a food-safe compound such as ethyl alcohol).

Within beverage dispensing equipment, a carbonator may be used to combine water and carbon dioxide gas to make carbonated water. Depending on the style of the carbonator, they can be at higher pressure and ambient temperature where the carbon dioxide is introduced to the gas, or at lower temperature (aka "cold carbonation") where the carbon dioxide is introduced to a chilled water, preferably at 32-34 F, through various mechanisms. The cold carbonation may use lower pressure $CO_2$ for the carbonation process than the ambient temperature carbonation.

Cold carbonators are often in close proximity or contact with traditional cold plates. Within a vapor chamber cold plate, $CO_2$ lines can be plumbed into one or more of the fluid containing tubes to create a carbonator that is integral to the cold plate. Integrating a carbonator into a vapor chamber cold plate provides a low cost efficient cold carbonation system.

Generally, a phase changing refrigerant in a vapor chamber transfers heat from the carbonator to the ice in the ice bin. The carbonator can be located inside the vapor chamber or located remotely from the vapor chamber and can be connected to the vapor chamber via a thermosiphon. The $CO_2$ may also be pre-chilled to increase its density and minimize the introduction of heat into the water during the carbonation operation.

Figure 13:
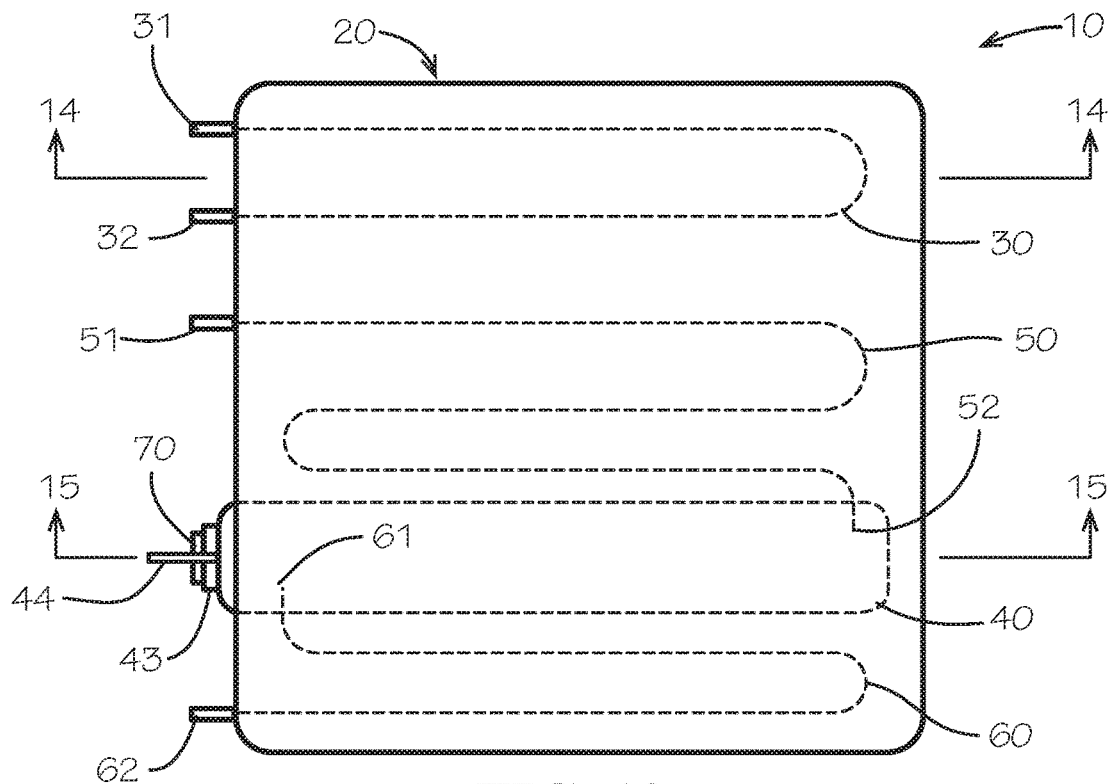
FIG. 13 depicts a top view of a heat exchanger in accordance with one or more embodiments of the disclosure.
Figure 14:
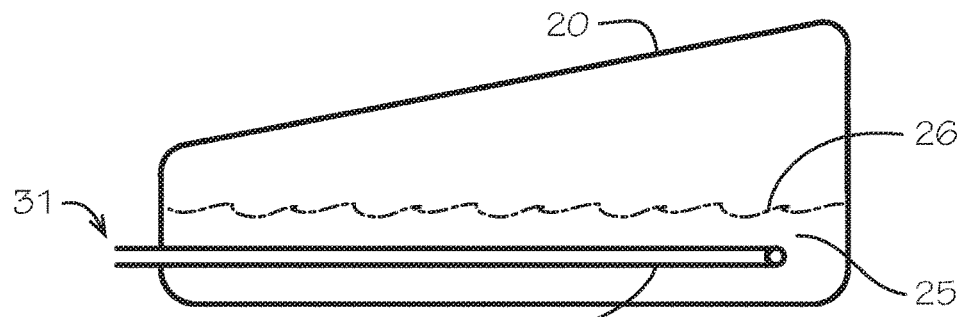
FIG. 14 depicts a partial cross-sectional view taken along line 2-2 in FIG. 13 in accordance with one or more embodiments of the disclosure.
Figure 15:
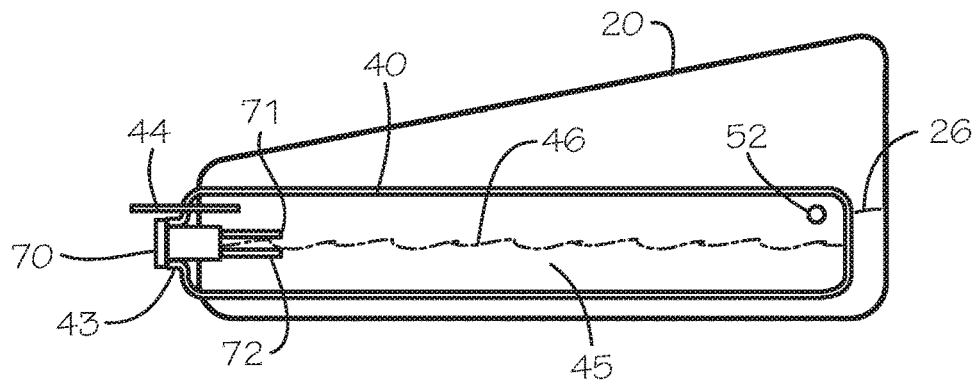
FIG. 15 is a partial cross-sectional view taken along line 3-3 in FIG. 13 in accordance with one or more embodiments of the disclosure.

Referring to FIGS. 13-15, a vapor chamber cold plate 10 may be bounded on all sides by a rigid shell 20. The vapor chamber cold plate 10 may include any number of ingredient chilling circuits. For example, ingredient circuit 30, which may begin at fitting 31 outside of the vapor chamber cold plate, may traverse the interior of the vapor chamber cold plate, and then may terminates in fitting 32 outside of the vapor chamber cold plate. The vapor chamber cold plate may also include a carbonator 40. The carbonator may be plumbed with a pre-chill circuit 50 and a post-chill circuit 60. The pre-chill circuit 50 may begin at fitting 51 located outside of the vapor chamber cold plate, may traverse the interior of the vapor chamber cold plate, and then may terminate at the carbonator 40 at fitting 52. The post-chill circuit 60 may begin at fitting 61 at the carbonator 40, may traverse the interior of the vapor chamber cold plate, and then may terminate at fitting 62 outside of the vapor chamber cold plate 10.

The vapor chamber may include an amount of a phase changing refrigerant 25 at a level 26 so that all of the thermal components inside of the vapor chamber are in thermal communication with the liquid phase of the phase changing refrigerant.

The carbonator 40 may have a neck 43 located on one end. The neck 43 may resemble the open end of a bottle. The neck 43 may be plugged with a stopper 70. The stopper 70 may include a high-level probe 71 and a low level probe 72. The level probes 71 and 72 may determine the level 46 of water 45 inside of the carbonator 40. The carbonator 40 may be located so as to be mostly inside of the vapor chamber, but one end may extend through the shell 20 so that the stopper 70 and thereby the probes 71 and 72 can be accessed easily from the exterior of the vapor chamber carbonator 10. $CO_2$ may be introduced into the carbonator via a tube 44 which may be located in the exposed end of the carbonator 40.

In operation, the carbonator 40 is substantially immersed in the refrigerant (25). Heat is transferred from the carbonator 40 to the refrigerant 25 causing the refrigerant to boil and thus to evaporate. The refrigerant in vapor form subsequently may condense on the roof of the vapor chamber thus transferring the heat to the ice on top of the vapor chamber cold plate.

Figure 16:
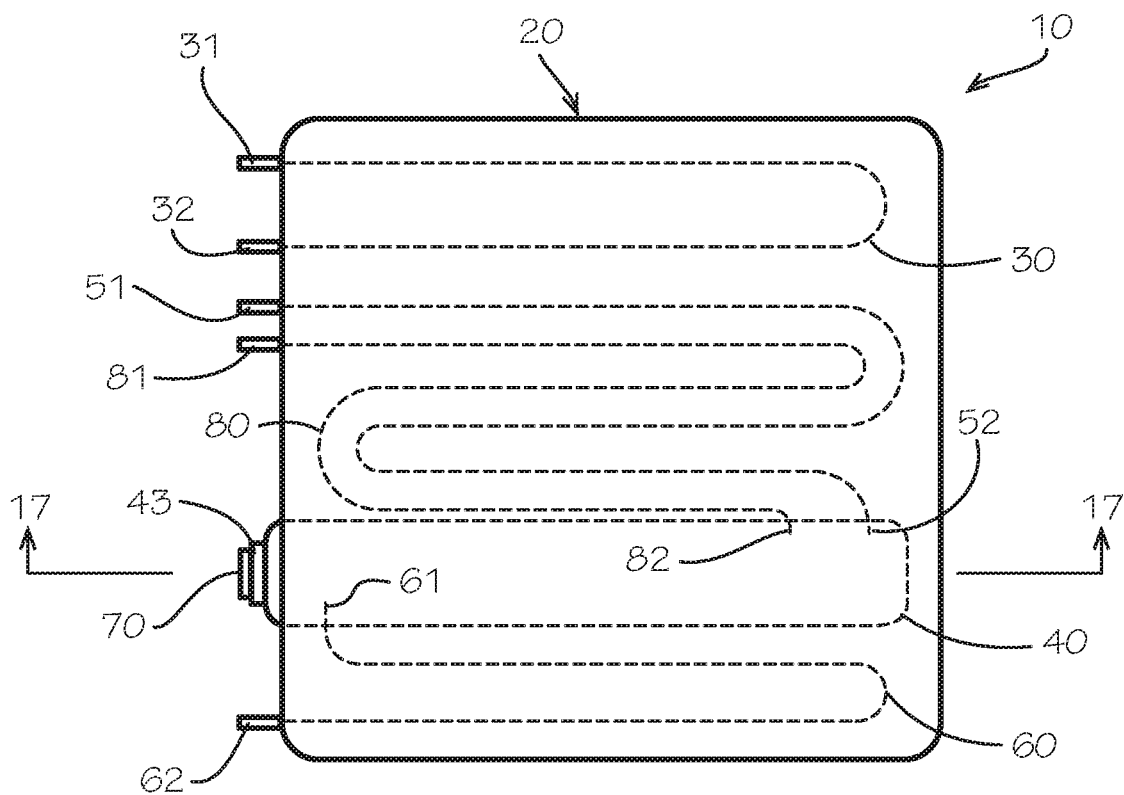
FIG. 16 depicts a top view of a heat exchanger in accordance with one or more embodiments of the disclosure.
Figure 17:
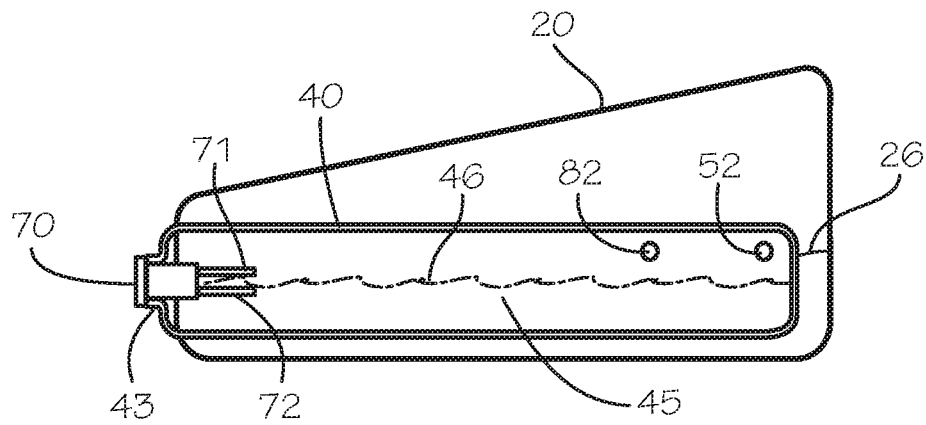
FIG. 17 is a partial cross-sectional view taken along line 5-5 in FIG. 16 in accordance with one or more embodiments of the disclosure.

Referring to FIGS. 16 and 17, the $CO_2$ may be pre-chilled within the vapor chamber cold plate before introduction into the carbonator 40. The $CO_2$ pre-chilling circuit 80 may begin at a fitting 81 located outside of the vapor chamber cold plate 10, may then traverse the interior of the vapor chamber cold plate, then may terminate at fitting 82 at the carbonator 40. Pre-chilling of the $CO_2$ may increase its density and minimize the introduction of heat into the water during the carbonation process.

Figure 18:
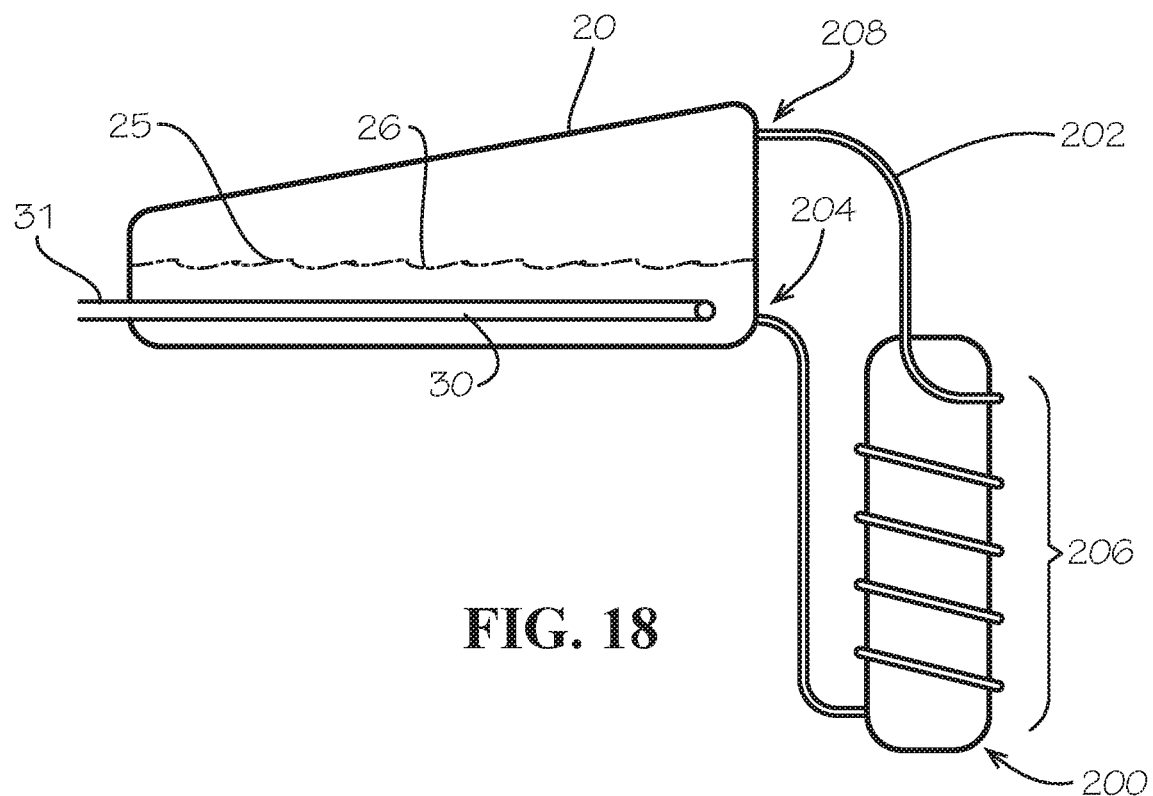
FIG. 18 is a partial cross-sectional view of a heat exchanger in accordance with one or more embodiments of the disclosure.

Referring to FIG. 18, the carbonator 200 may be located remotely from the vapor chamber cold plate 10. A refrigerant circuit 202 may begin at fitting 204 located below refrigerant level 26. The refrigerant circuit 202 may descend to the bottom of the carbonator 200. The refrigerant circuit 202 may then ascend via a circuitous route of thermal contact 206 with carbonator 200. The ascending circuitous route of thermal contact 206 may be for example a helix. The refrigerant circuit 202 may then return to the vapor chamber cold plate 10 at fitting 208 located above refrigerant level 26.

In operation, refrigerant circuit 202 may operate as a thermosiphon. Liquid refrigerant may travel by gravity from the interior of the vapor chamber cold plate 10, through fitting 204, then down refrigerant circuit 202 until the refrigerant comes into thermal contact with the carbonator 200 during the ascending circuitous route 206, where the refrigerant 25 absorbs heat from the carbonator 200 and begins to boil. The bubbles rise up through the ascending circuitous route 206. By the end of the ascending circuitous route 206, all of the refrigerant 25 has evaporated and the vapor phase of the refrigerant returns to the interior of the vapor chamber cold plate 10 via the refrigerant circuit 202 through fitting 208. The refrigerant in vapor form upon return to the vapor chamber cold plate, subsequently may condense on the roof of the vapor chamber cold plate thus transferring the heat to the ice on top of the vapor chamber cold plate. Carbonator 200 and refrigerant circuit 202 may be insulated.

Figure 19:
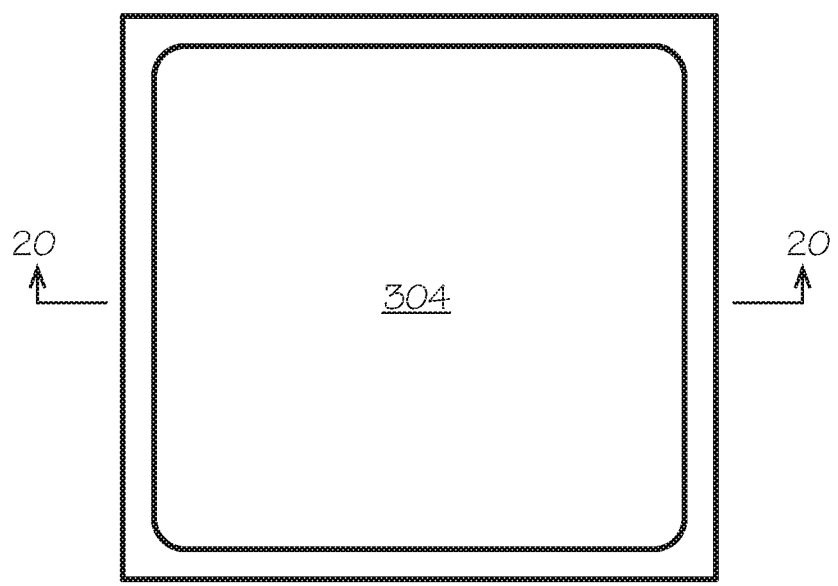
FIG. 19 is a top view of a heat exchanger in accordance with one or more embodiments of the disclosure.
Figure 20:
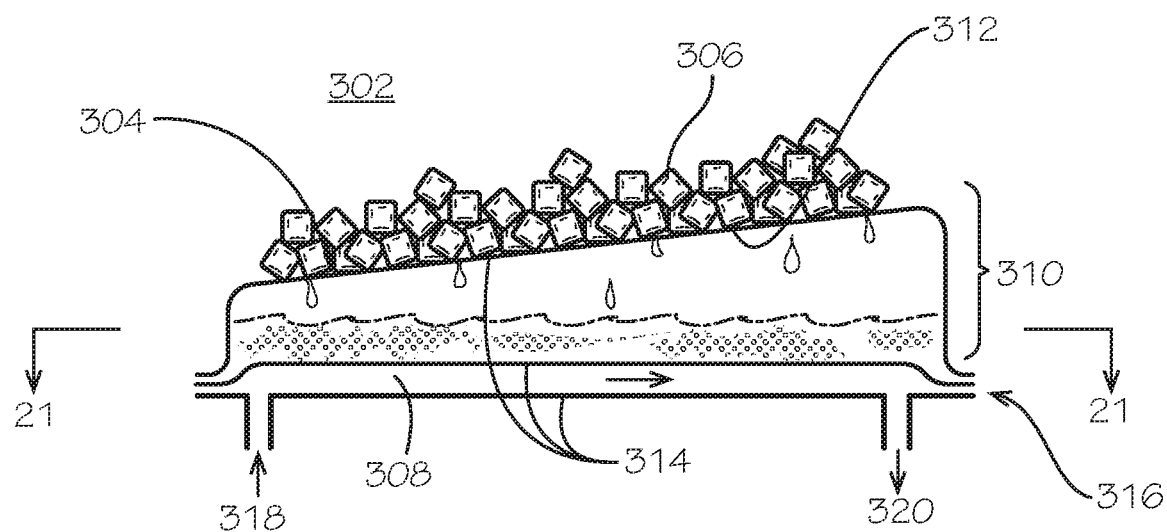
FIG. 20 is a partial cross-sectional view taken along the line A-A in FIG. 19 in accordance with one or more embodiments of the disclosure.
Figure 21:
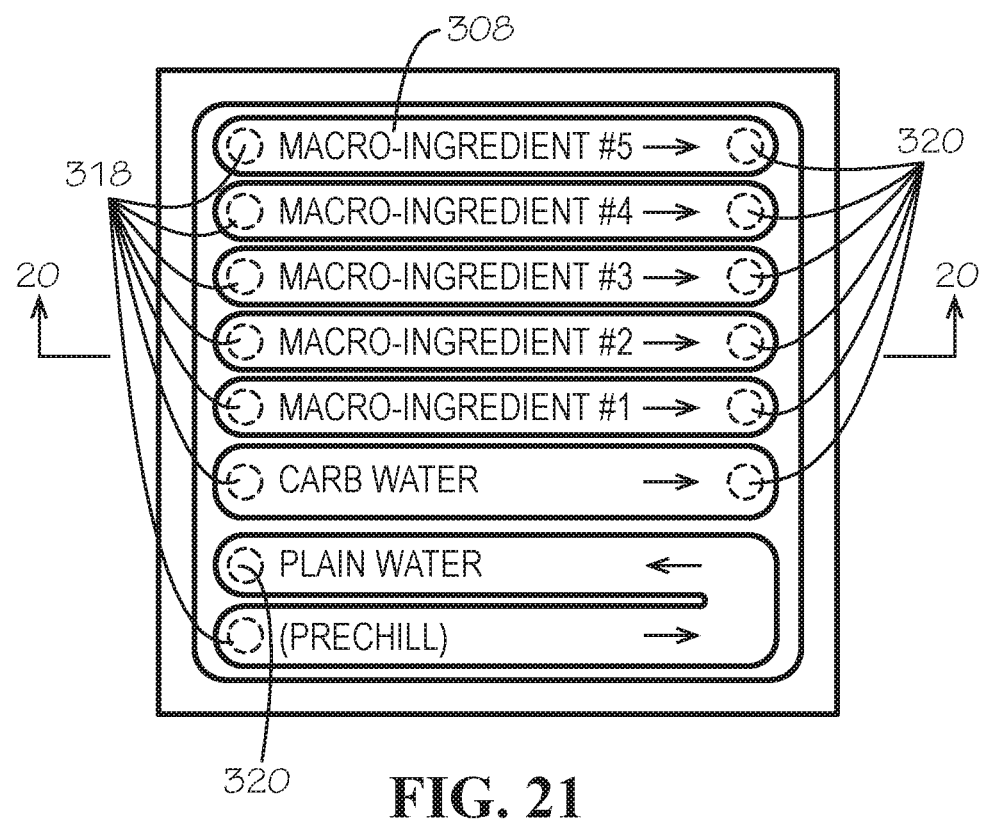
FIG. 21 is a partial cross-sectional view taken along the line B-B in FIG. 20 in accordance with one or more embodiments of the disclosure.

FIGS. 19-21 depict a heat pipe bonded plate heat exchanger 300. The heat pipe bonded plate heat exchanger 300 is shown to be a low cost alternative to a conventional cast aluminum cold plate. The heat exchanger 300 can be located in the bottom of an ice bin 302 and can include a sloping top surface 304. The top surface 304 may contact the ice 306. As the ice 306 melts, it flow down the top surface 304 of the cold plate and is continuously replaced by additional ice at the top of the slope by a conventional ice handling mechanism (not shown) located inside the ice bin 302.

The bottom section of the heat pipe bonded plate heat exchanger 300 may include channels 308 through which flow the beverage ingredients to be chilled prior to dispensing. The interior of the heat exchanger 300 may include enough phase change refrigerant 310 so that the channels 308 through which the ingredients flow are continuously exposed to the liquid phase of the refrigerant 310. Although the channels are shown in a single layer in the schematic drawings, the channels could be arranged in multiple layers designed so that the liquid refrigerant permeates to all layers of ingredient channels. The type of refrigerant and internal pressure of the heat exchanger may be selected to make the phase change occur in the range of 33° F. to 35° F. (0.56° C. to 1.67° C.). In one example, the refrigerant may be R134a at approximately 28 psi. The system can be charged via a port (not shown) like a hermetic compressor as is used in conventional refrigeration systems.

As the initially warm beverage ingredients flow through the channels 308, they reject heat through the channel walls to be absorbed by the refrigerant 310, causing the refrigerant 310 to boil and thus vaporize. The vaporized refrigerant rises to contact the top surface 312 of the interior of the heat exchanger 300 where the vapor rejects heat through the top surface 304 to be absorbed by the ice 306 thus melting the ice and condensing the vaporized refrigerant into a liquid. The liquid refrigerant returns by gravity to the bottom portion of the heat exchanger 300 and the cycle continuously repeats. Due to the phase change across the top surface of the heat exchanger, the top surface of the heat exchanger is substantially at a uniform temperature.

The plates 314 of the heat exchanger can be stamped out of a metal compatible with the beverage ingredients (e.g. 304 stainless steel). The plates 314 may be assembled by a process that would not introduce materials that may be incompatible with the beverage ingredients. An example of such a process would be diffusion bonding 316. The bottom surface of the heat exchanger may include multiple ports (e.g., inlet 318 and outlet 320) aligned with the channels to facilitate beverage ingredient flow through the channels.

The ingredient chilling channels 308 are shown as stamped and bonded channels, but ingredient channels can be created by other methods, for example by the use of tubes instead of stamped channels.

In this manner, FIGS. 13-21 disclose a heat exchanger including a plurality of fluid channels that extend along at least one dimension of the heat exchanger, with each of the fluid channels including a fluid inlet and a fluid outlet. The heat exchanger also may include a top surface of the heat exchanger enclosing an area around the plurality of fluid channels. In addition, the heat exchanger may include a working fluid within the area adapted to absorb heat rejected from fluid passing through the plurality of fluid channels.

The working fluid may be further adapted to reject heat through the top surface of the heat exchanger. The working fluid also may be adapted to boil upon absorbing heat rejected from fluid passing through the plurality of fluid channels, and the working fluid may be adapted to condense upon rejecting heat through the top surface. The working fluid and internal pressure of the area may facilitate boiling of the working fluid at around 33° to 40° F.

The plurality of fluid channels may be formed from a first layer affixed to a second layer, the first layer defining the volume and flow path of each of the plurality of fluid channels, and the second layer comprising the fluid inlet and fluid outlet of each of the plurality of fluid channels. The heat exchanger may include a third layer defining the top surface of the heat exchanger and the area around the plurality of fluid channels, the third layer being affixed to the top of the first layer. The first layer, the second layer, and the third layer may be stamped steel plates and affixed to each other by a diffusion bond. The first layer further may define a contact surface around each of the fluid channels for making contact with the second layer.

The plurality of fluid channels may be tubes. The area may comprise a top surface of the plurality of fluid channels. The top surface may be a sloping top surface.

The heat exchanger further may include a carbonator in thermal communication with the working fluid. One of the plurality of fluid channels may comprise a still water pre-chill circuit that terminates at an inlet to the carbonator. One of the plurality of fluid channels may comprises a carbonated water post-chill circuit that begins at an outlet of the carbonator. One of the plurality of fluid channels may be a $CO_2$ pre-chill circuit that terminates at an inlet to the carbonator. The carbonator may be substantially immersed in the working fluid. One or more surfaces of the carbonator may not be in fluid contact with the working fluid. A vertical most surface of the carbonator may not be in fluid contact with the working fluid. The carbonator may be oriented horizontally within the area. The working fluid may be in a tube in thermal contact with the carbonator. The carbonator may be disposed below a fluid level of the working fluid within the area. The tube may have an inlet within the area at a point below the fluid level of the working fluid. The tube may have an outlet within the area at a point above the fluid level of the working fluid. The tube may follow a thermal contact path from the bottom of the carbonator to the top of the carbonator. The carbonator may be oriented vertically.

FIGS. 13-21 also may disclose a heat exchanger including a first layer having a fluid inlet and fluid outlet for each of a plurality of fluid channels. The heat exchanger also may include a second layer affixed to the top of the first layer, the second layer comprising a plurality of troughs that define a volume and flow path of the plurality of fluid channels. In addition, the heat exchanger may include a third layer affixed to the top of the second layer, the third layer comprising a bin sized to enclose the plurality of troughs and define an enclosed area.

The heat exchanger may further include a working fluid positioned within the enclosed area adapted to absorb heat rejected from fluid passing through the plurality of fluid channels. The working fluid may be further adapted to reject heat through the top surface of the third layer of the heat exchanger. The working fluid may be adapted to boil upon absorbing heat rejected from fluid passing through the plurality of fluid channels, and the working fluid may be adapted to condense upon rejecting heat through the top surface of the third layer. The working fluid and internal pressure of the area may facilitate boiling of the working fluid at around 33° to 40° Fahrenheit. The working fluid may be R134a at about 28 psi.

The top surface of the third layer may be a sloped surface. Each of the first, second, and third layers may include a flange for fluidly sealing each of the first, second, and third layers together. The second layer further may include a contact surface around and between each of the plurality of troughs, the contact surface adapted to fluidly seal the second layer to the top of the first layer. The first, second, and third layers may be steel plates and affixed to each other by a diffusion bond. The third layer may include a port adapted to charge the enclosed area with a working fluid.

FIGS. 22-26 are directed to additional embodiments of heat exchangers for cooling one or more fluids in a beverage dispenser. Typically, a cold plate may include tubes of passivated stainless steel cast into an aluminum block, which may form the basis for cooling macro-fluids using ice in a fountain beverage machine.

The cold plate provides the following functions: (1) transfer of heat from macro fluids to the ice-cooled surface of the cold plate; (2) management of ice-melt to a drain; (3) cleanability to NSF requirements on both the ice side and the macro fluid side; and (4) serve as a thermal mass (heat battery) to rapidly cool macro fluids.

Within liquid-to-liquid heat exchanger art, one approach is to use a stacked-plate heat exchanger. Each plate of these devices defines a fluid conduction path, and alternating spaces between plates contain the two fluids to be cooled.

The disclosure here is to redesign the fluid path to enable multiple macro fluids to be cooled by the exchanger. Ice melt could be used as one of the fluids to enable more effective cooling through the plate mechanism.

Optionally, a phase change material that had a melting point (or boiling point) just above that of ice and a relatively high latent heat of fusion—for example, paraffin, peanut oil, or glycerol triacetate-could be used as filler between selected plates to augment the thermal mass of the unit. Alternatively, water could be used as a high thermal mass (but not phase changing) medium in the region of interest to augment the thermal mass of the device.

Figure 22:
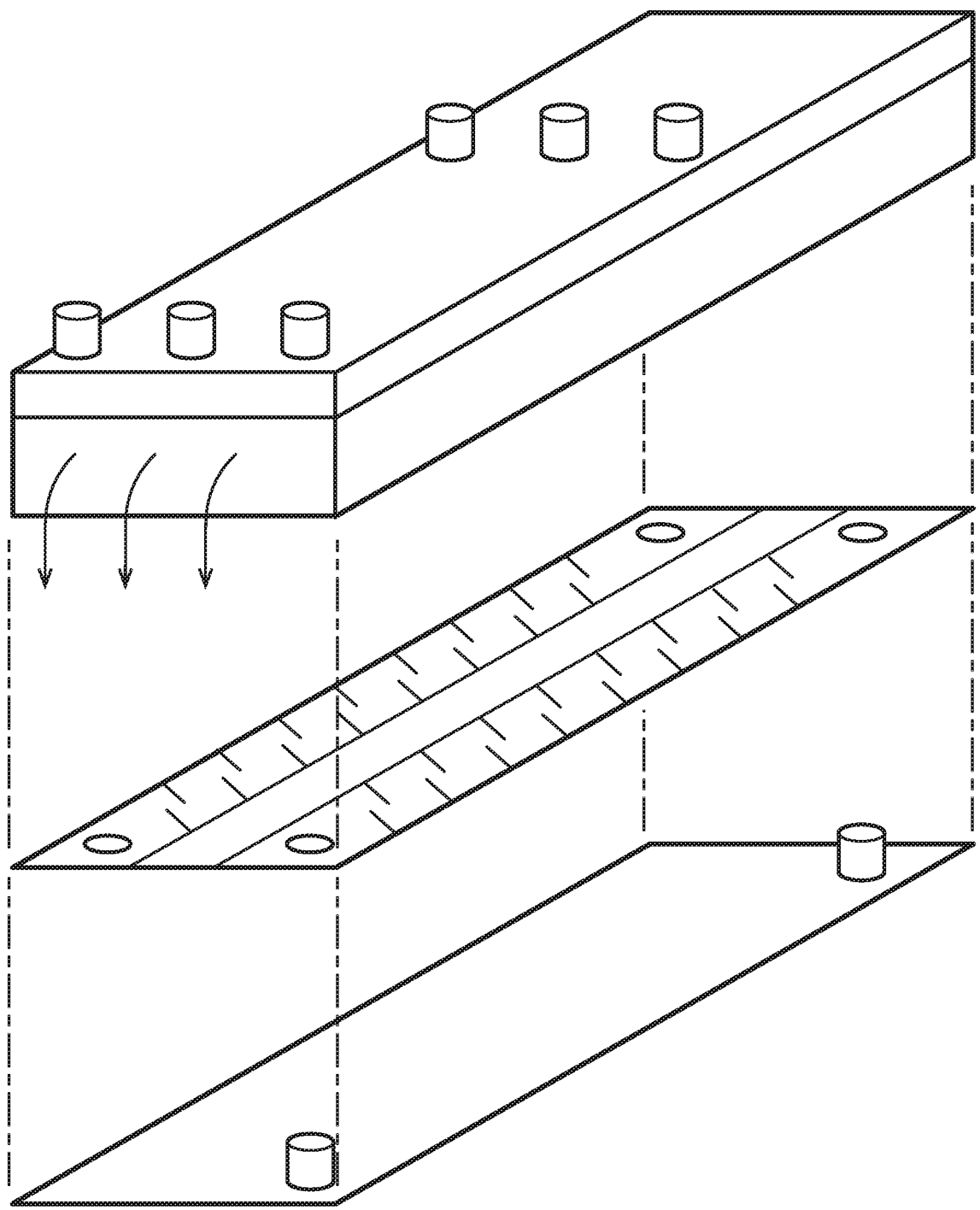
FIGS. 22-26 are directed to additional embodiments of heat exchangers for cooling one or more fluids in a beverage dispenser.
Figure 23:
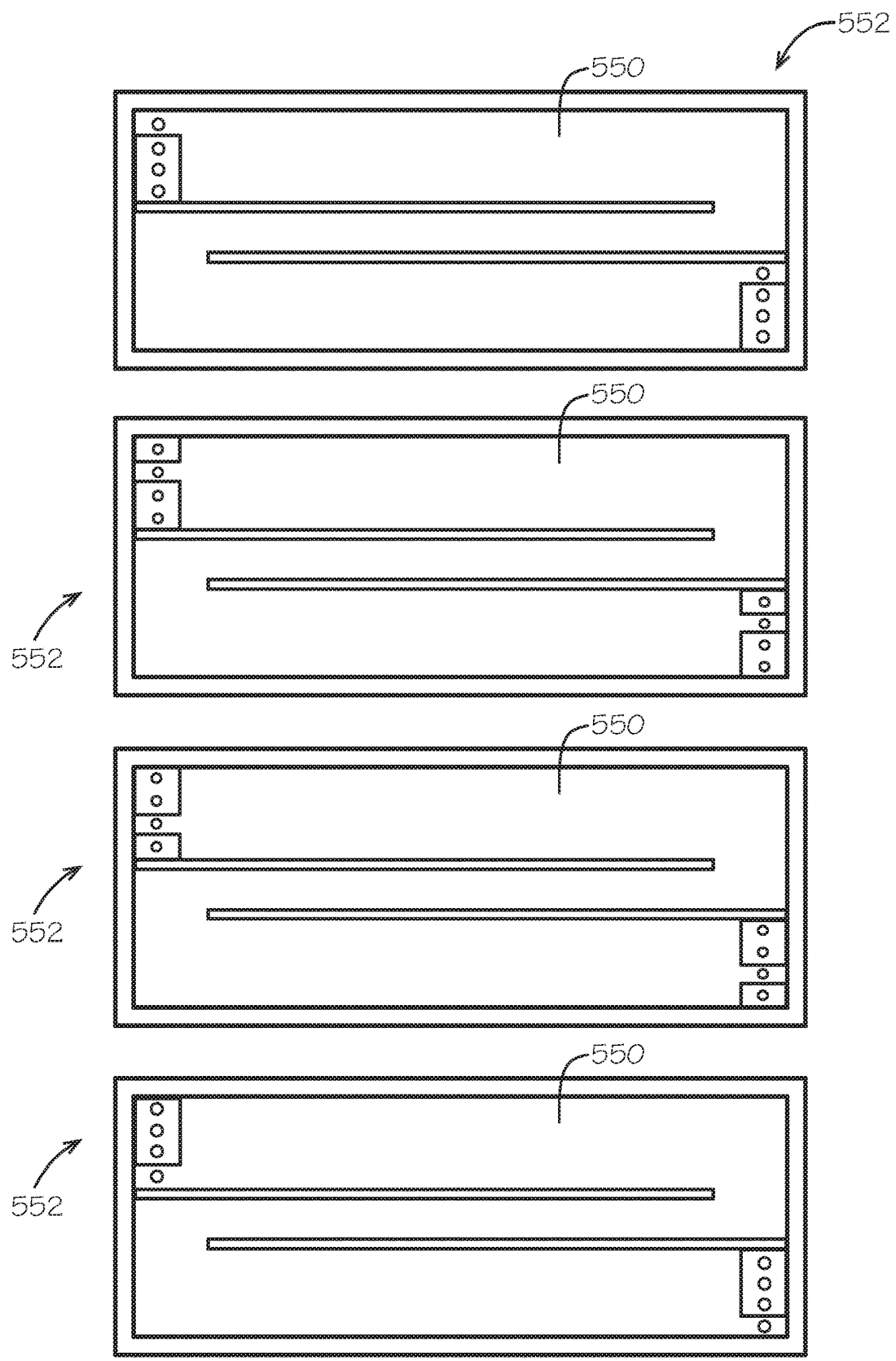
Figure 24:
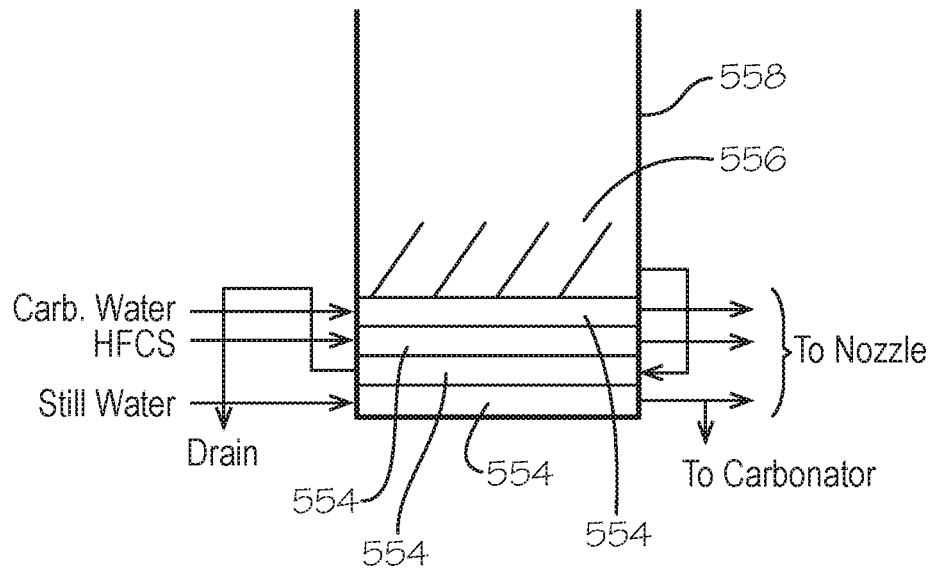
Figure 25:
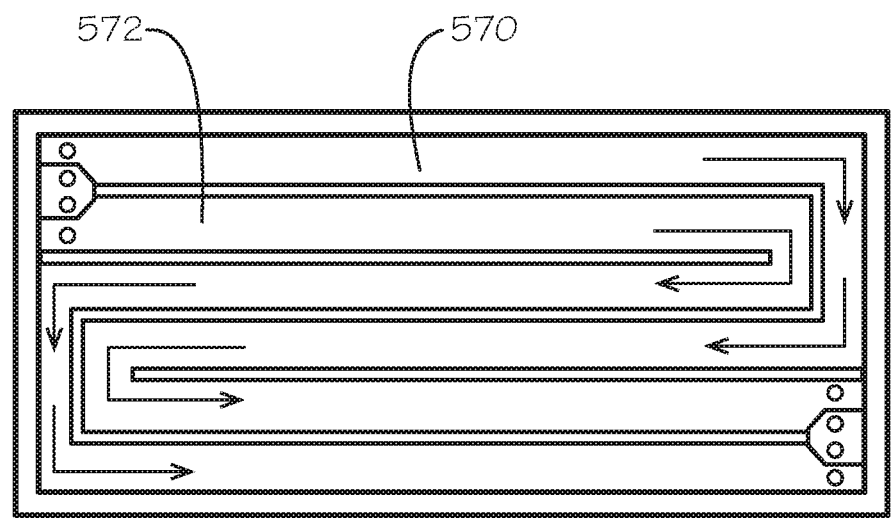
Figure 26:
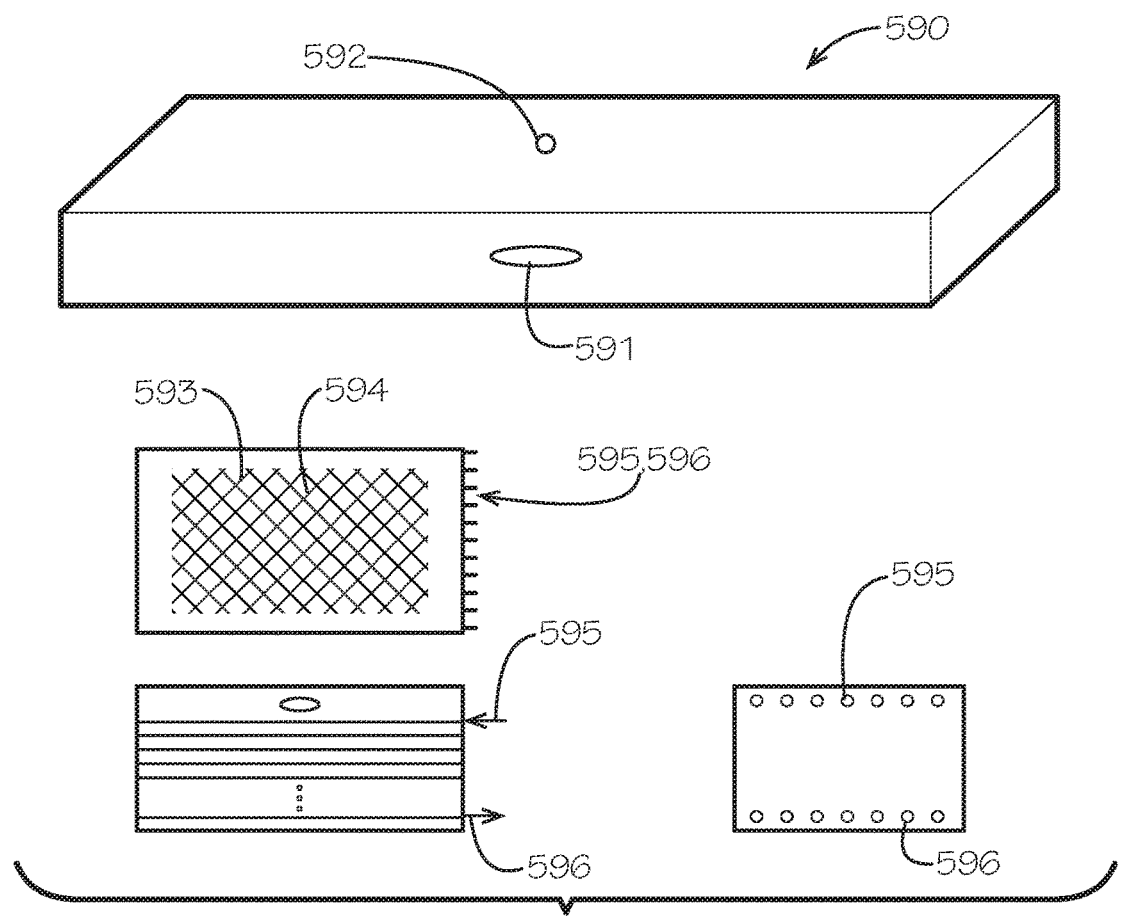

FIGS. 22-26 depict stacked plate heat exchangers. For example, FIG. 22 depicts a number of stacked plates having a number of fluid flow channels therein. FIG. 23 depicts a single channel 550 per plate heat exchanger 552. The channels 550 may be disposed within stamped sheets. In some instances, the channels 550 may include an inlet and an outlet for fluid flow, which may include water, carbonated water, macro ingredients, and HFCS, among others. The fluid flows may flow with our counter to a ice melt flow. FIG. 24 depicts a number of plate heat exchangers 554 stacked together. Ice 556 may be disposed within a bin 558 above the plate heat exchangers 554. One or more fluid flow lines may pass through each of the plate heat exchangers 554. For example, water, carbonated water, macro ingredients, HFCS, and ice melt may be channeled through the plate heat exchangers 554. FIG. 25 depicts a plate heat exchanger with multiple channels 570, 572. FIG. 26 depicts an example plate heat exchanger using ice melt and a phase change material. For example, the heat exchanger may have an ice bin 590 with a drain port 591. The ice bin also may include a second drain port 592 that feeds to an ice melt inlet 593. A removable screen 594 may be disposed on top of the heat exchanger 590 before the inlet to prevent ice bridge formation. The heat exchanger 590 may include a number of inlets 595 and outlet 596 for ingredients to exchanger heat with the ice melt.

FIGS. 27-32 are directed to additional embodiments of heat exchangers, particularly plate heat exchangers (PHE), for cooling one or more fluids in a beverage dispenser. The instantaneous heat transfer capability is great than 20 kW for at least 5 seconds (assuming entering sweetener and water at 25° C., leaving sweetener and water at 4° C.). If assuming similar PHE volume as current cold-plate, the heat transfer rate per unit volume is 830 kW/m$^3$. The current cold-plate cooling capacity is estimated 60 kJ/K based its volume and aluminum properties.

Figure 27:
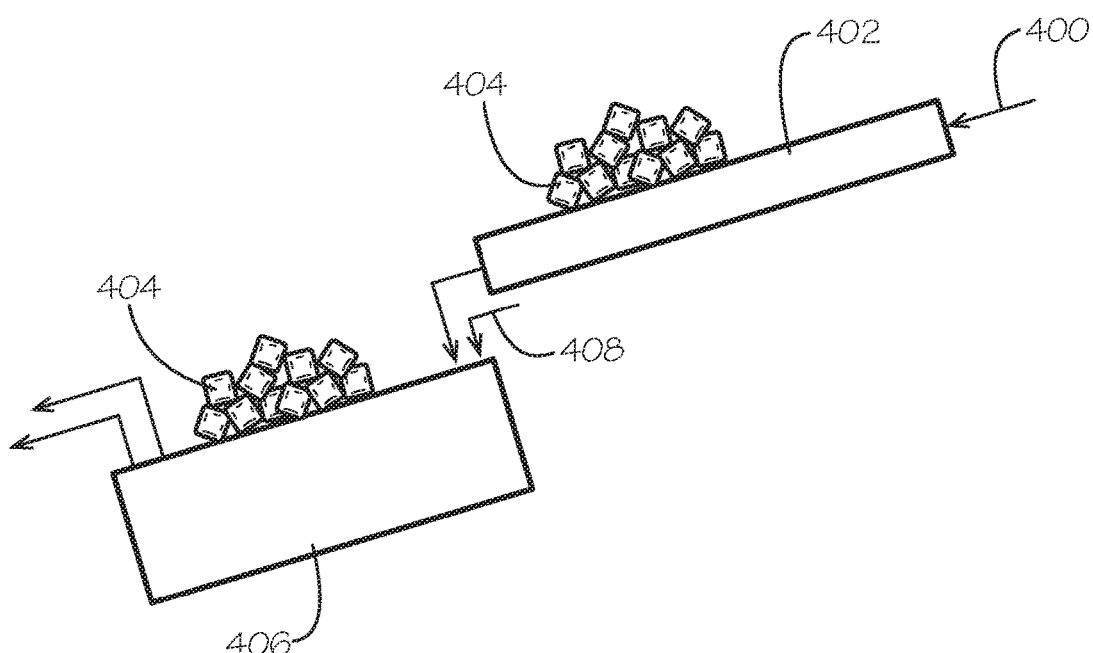
FIGS. 27-32 are directed to additional embodiments of heat exchangers for cooling one or more fluids in a beverage dispenser.
Figure 28:
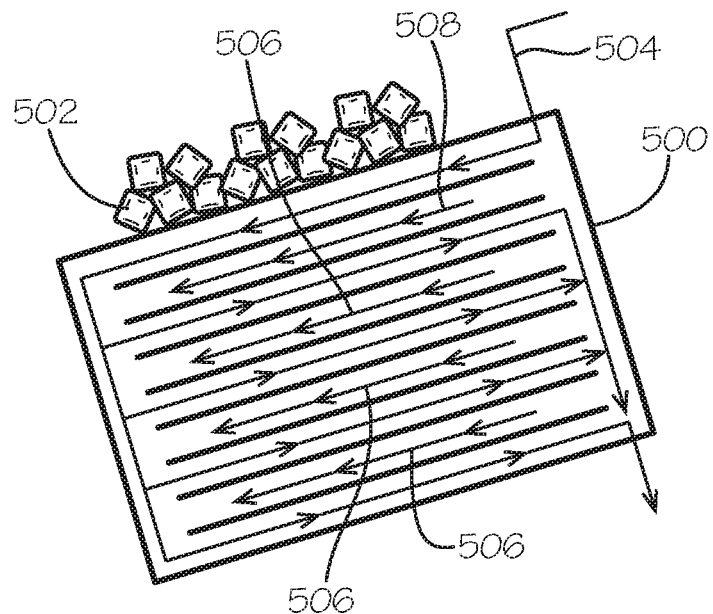

There are five embodiments depicted in FIGS. 27-32 for the PHE based alternative cold-plate design. Fundamentally, there are 2 types of heat transfer mechanisms, active and passive. FIGS. 27 and 28 are active cooling, which means that water (including carbonated water), as the main cooling medium, picks up cooling through either a simplified cold-plate (FIG. 27) or through first layer of PHE plate (FIG. 28), then brings the cooling into the core of the PHE to absorb heat from sweeteners or other ingredients. In this way, the water (including carbonated water) serves as the main heat exchange medium. It has higher transfer coefficients than the passive cooling, as described later. However, the water temperature leaving the PHE may be impacted adversely. As depicted in FIG. 27, a water line 400 may pass through a cold plate 402. Ice 404 may be disposed on the cold plate 402. The chilled water may be provided to a PHE 406. In addition, a HFCS and macro-ingredient line 408 may pass through the PHE 406. In FIG. 28, a PHE 500 may include a number of lines passing therethrough. Ice 502 may be disposed on top of the PHE 500. The lines may include a water line 504 and a number of macro-lines 506. In addition, a HFCS line 508 may pass through the PHE 500.

Figure 29:
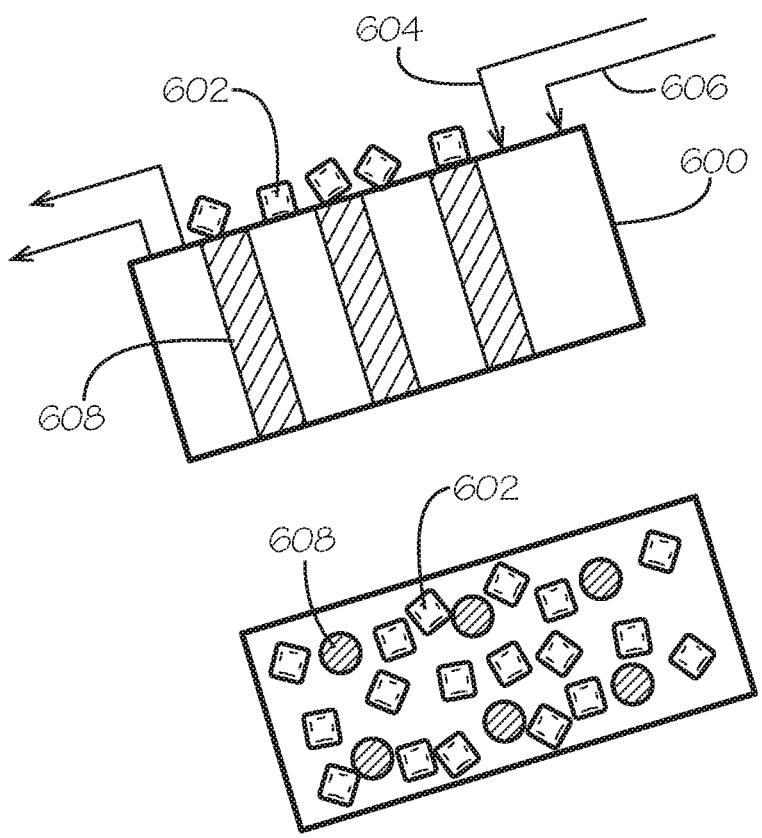
Figure 30:
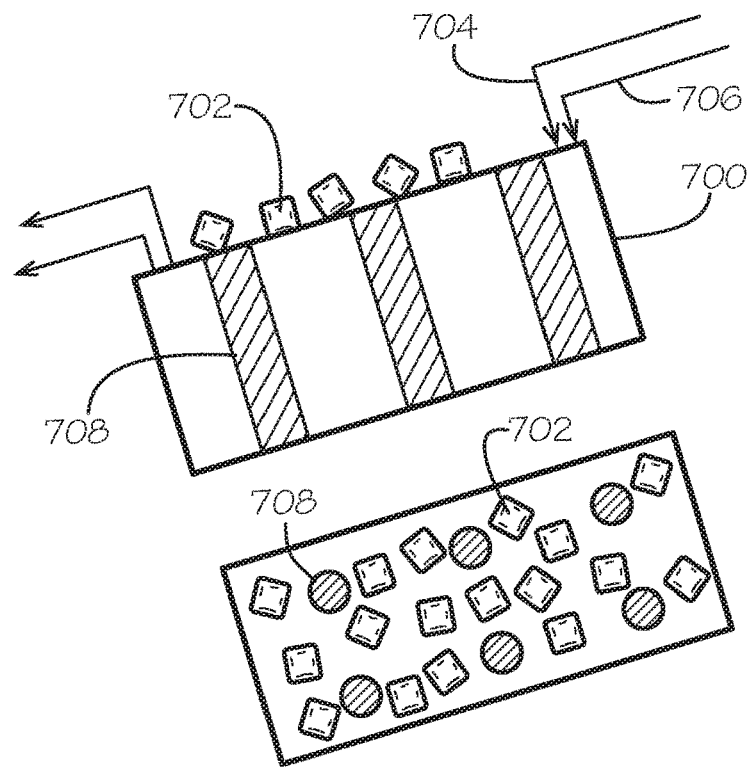
Figure 31:
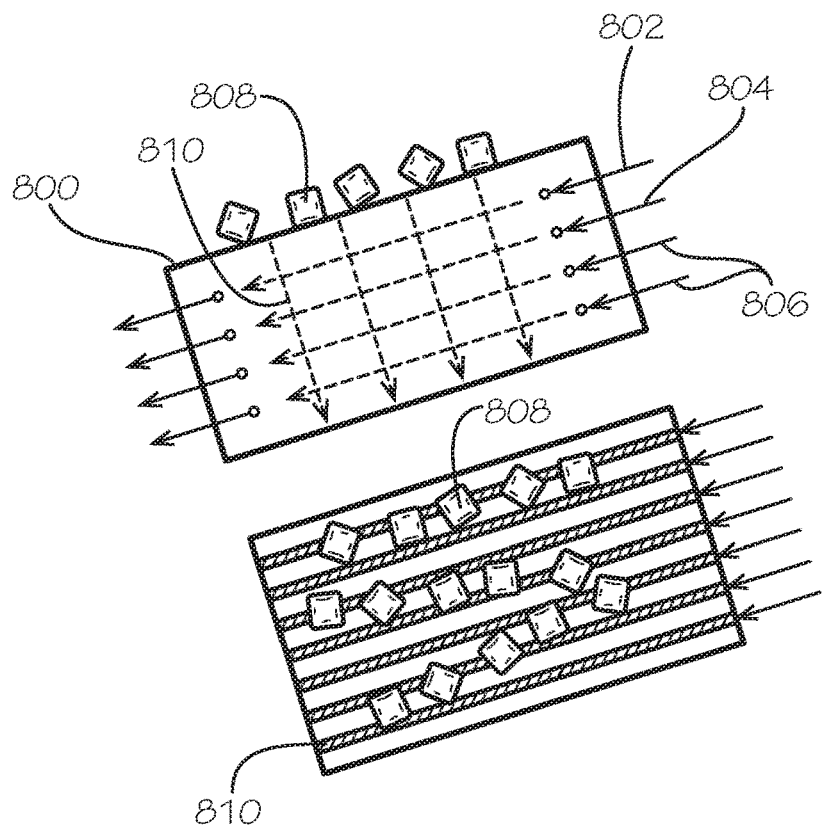

FIGS. 29-31 depict passive cooling. The cooling is provided across the PHE's through conduction (FIG. 29 shows solid bars connecting individual plates), melting water (counter flow in FIG. 30, cross flow in FIG. 31). However, the heat transfer capability is limited to the water film formation along the channels (FIG. 30) or the plates (FIG. 31). As depicted in FIG. 29, the PHE 600 includes ice 602 disposed thereon. A chilled water 604 may pass through the PHE 600. In addition, a HFCS and macro-ingredient line 606 may pass through the PHE 600. The PHE 600 may include a number of solid bars 608 extending therethrough for interlinking plates. As depicted in FIG. 30, the PHE 700 includes ice 702 disposed thereon. A chilled water 704 may pass through the PHE 700. In addition, a HFCS and macro-ingredient line 706 may pass through the PHE 700. The PHE 700 may include a number of passageways 708 extending therethrough for the flow of melted ice. In FIG. 31, the PHE 800 includes a number of lines passing therethrough. The lines include a water line 802, a HFCS line 804, and a macro-ingredient line 806. Ice 808 may be disposed on top of the PHE 800. The PHE 800 may include a number of passageways 810 extending therethrough for the flow of melted ice.

Figure 32:
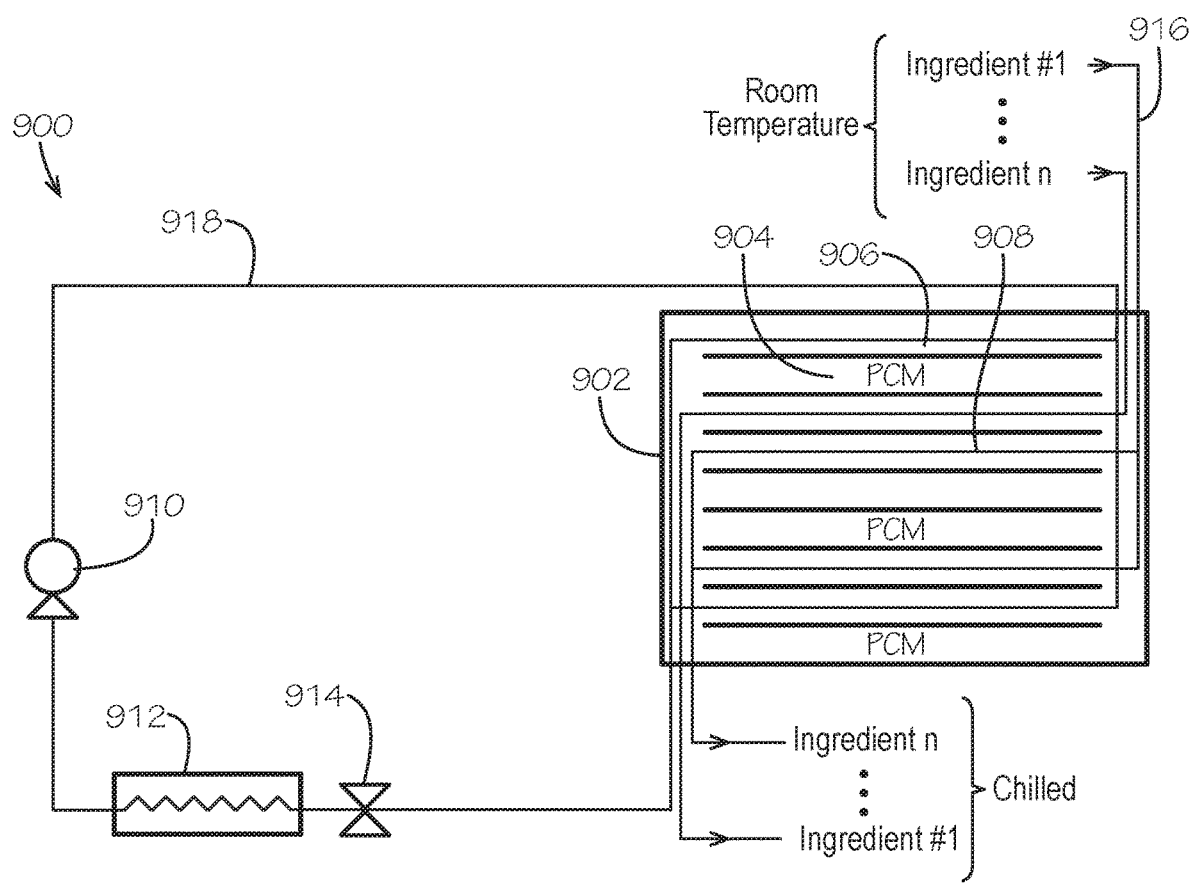

FIG. 32 depicts a plate heat exchanger cooling circuit 900. The circuit 900 may include a plate heat exchanger 902 having layers filled with air or a phase change material 904, which may separate a refrigerant layer (or line) 906 and an ingredient layer (or line) 908. The circuit also may include a pump 910, a heat exchanger 912, a throttle device 914. In this manner, one or more ingredient lines 916 may pass the plate heat exchanger 902, while a refrigerant may pass through the refrigerant cycle 918. The plate heat exchanger 902 provides a high heat transfer rate per unit volume. The phase change material 904 may prevent ingredient freezing and also serve as thermal storage to meet peak load.

Other CHE's mentioned in Qi et al. (2011) should be evaluated, with particular interest for Printed Circuit Heat Exchanger and the Marbond Heat Exchanger.

Thermal Capacitor (TC) (Nielson et al. 2013) may also be reviewed extensively in association with Phase Change Material (PCM) application in current design improvement (Sharma, et al. 2009). In the current beverage dispenser, the cooling load demand varies significantly throughout a day and with some level of predictability. This creates an opportunity to shift the load from daytime to low rate night time for both energy efficiency and financial aspect. However, the charge and discharge rate of PCM in addition to the peak load calculation needs to be carried out to ensure its successful application in this alternative cold-plate design (Chiu, 2011).

REFERENCES

D. A. Reay, Compact heat exchangers: A review of current equipment and R&D in the field, Heat Recovery Systems & CHP Vol. 14, No. 5, pp. 459-474, 1994

Qi Li, Gilles Flamant, Xigang Yuan, Pierre Neveu, Lingai Luo, Compact heat exchangers: A review and future applications for a new generation of high temperature solar receivers, Renewable and Sustainable Energy Reviews 15, pp 4855-4875, 2011

Nielson, Karen and Cox, Jordan Tracy, "Design and Optimization of a Thermal Capacitor" (2013). Undergraduate Honors Theses. Paper 135.

Atul Sharma, V. V. Tyagi, C. R. Chen, D. Budhhi, Review on thermal energy storage with phase change materials and applications, Renewable and Sustainable Energy Reviews 13, pp 318-345, 2009

Justin Ning-Wei Chiu, Heat transfer aspects of using phase change material in thermal energy storage applications, Thesis, KTH Industrial Engineering and Management, ISBN 978-91-7501-034-2, 2011

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A plate heat exchanger disposed in thermal contact with a cooling media within or near a beverage dispenser for cooling one or more fluids, the plate heat exchanger comprising:
 a top plate;
 a bottom plate;
 an outer boundary wall;
 a plurality of fluid flow paths disposed between the top plate and the bottom plate; and
 a fin disposed within each of the plurality of fluid flow paths and in thermal contact with the top plate and the bottom plate,
 wherein each of the plurality of fluid flow paths comprise an inlet flow path and an outlet flow path, wherein the inlet flow path of a respective fluid flow path is disposed adjacent to another inlet flow path of a respective fluid flow path that is adjacent thereto, and wherein the adjacent inlet flow paths are separated by and share an internal wall.

2. The plate heat exchanger of claim 1, further comprising a plurality of the plate heat exchangers stacked together.

3. The plate heat exchanger of claim 1, wherein the fin comprises a single unitary structure folded to form a number of U-shaped channels.

4. The plate heat exchanger of claim 1, wherein the fin comprises a single unitary structure comprising a plurality of rows and a plurality of columns.

5. The plate heat exchanger of claim 4, wherein the plurality of rows are at least partially offset from adjacent rows.

6. A plate heat exchanger disposed in thermal contact with a cooling media within or near a beverage dispenser for cooling one or more fluids, the plate heat exchanger comprising:
 a top plate;
 a bottom plate;
 an outer boundary wall;
 a plurality of fluid flow paths disposed between the top plate and the bottom plate; and
 a fin disposed within each of the plurality of fluid flow paths and in thermal contact with the top plate and the bottom plate,
wherein each of the plurality of fluid flow paths comprise an inlet flow path and an outlet flow path,
wherein the outlet flow path of a respective fluid flow path is disposed adjacent to another outlet flow path of a respective fluid flow path that is adjacent thereto, and
wherein the adjacent outlet flow paths are separated by and share an internal wall.

7. The plate heat exchanger of claim 6, further comprising a plurality of the plate heat exchangers stacked together.

8. The plate heat exchanger of claim 6, wherein the fin comprises a single unitary structure folded to form a number of U-shaped channels.

9. The plate heat exchanger of claim 6, wherein the fin comprises a single unitary structure comprising a plurality of rows and a plurality of columns.

10. The plate heat exchanger of claim 9, wherein the plurality of rows are at least partially offset from adjacent rows.

* * * * *